US008774780B2

(12) United States Patent
McGary et al.

(10) Patent No.: US 8,774,780 B2
(45) Date of Patent: *Jul. 8, 2014

(54) SYSTEM AND METHOD FOR PROVIDING MOBILE DEVICE SERVICES USING SMS COMMUNICATIONS

(75) Inventors: Faith McGary, Bethlehem, PA (US); Ian Bacon, Manassas, VA (US); Michael Bates, Bethlehem, PA (US); Christine Baumeister, Schwenksville, PA (US)

(73) Assignee: Grape Technology Group, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,726

(22) Filed: Sep. 6, 2012

(65) Prior Publication Data

US 2013/0237195 A1 Sep. 12, 2013

Related U.S. Application Data

(63) Continuation of application No. 13/198,945, filed on Aug. 5, 2011, now Pat. No. 8,412,169, which is a continuation of application No. 11/485,189, filed on Jul. 12, 2006, now Pat. No. 7,996,023.

(60) Provisional application No. 60/699,050, filed on Jul. 13, 2005, provisional application No. 60/783,612, filed on Mar. 17, 2006, provisional application No. 60/757,920, filed on Jan. 9, 2006, provisional application No. 60/763,949, filed on Jan. 30, 2006, provisional application No. 60/772,535, filed on Feb. 9, 2006, provisional application No. 60/786,834, filed on Mar. 28, 2006, provisional application No. 60/799,413, filed on May 10, 2006, provisional application No. 60/799,719, filed on May 11, 2006.

(51) Int. Cl.
*H04W 4/12* (2009.01)

(52) U.S. Cl.
USPC .................................................. 455/414.3

(58) Field of Classification Search
USPC ............. 455/414.1, 466, 461.1–461.6, 414.2, 455/414, 2, 404, 556.2, 433, 432.2, 435.1, 455/403, 465, 422.1, 463, 401, 445; 379/114.15, 88.17, 88.14, 88.16, 379/221.09, 221.1, 221.08; 370/219, 522, 370/400, 401, 490; 709/219, 216, 217
See application file for complete search history.

(56) References Cited

U.S. PATENT DOCUMENTS 5,625,668 A 4/1997 Loomis et al.
5,764,731 A 6/1998 Yablon (Continued)

FOREIGN PATENT DOCUMENTS

WO WO 01/08430 2/2001
WO WO 2005/053296 6/2005

OTHER PUBLICATIONS

International Search Report dated Jan. 22, 2010.

*Primary Examiner* — Melody Mehrpour
(74) *Attorney, Agent, or Firm* — Sofer & Haroun, LLP

(57) ABSTRACT

An enhanced services platform has an interface for receiving a communication from a user requesting a desired data. An automated response module parses the communication and retrieves the desired data. The enhanced services platform arranges the desired data into a response message that is sent to the user, where the response message includes an embedded code corresponding to a link allowing the user to re-contact the enhanced services platform. An operator assistance module receives communications from the user initiated via the link to provide further assistance regarding the user's request.

20 Claims, 17 Drawing Sheets

(56) References Cited

U.S. PATENT DOCUMENTS

| | | | |
|---|---|---|---|
| 6,076,099 A | 6/2000 | Chen et al. | |
| 6,091,956 A | 7/2000 | Hollenberg | |
| 6,317,718 B1 | 11/2001 | Fano | |
| 6,442,242 B1 | 8/2002 | McAllister et al. | |
| 6,463,055 B1 | 10/2002 | Lupien et al. | |
| 6,513,063 B1 | 1/2003 | Julia et al. | |
| 6,560,456 B1 | 5/2003 | Lohtia | |
| 6,560,800 B1 | 5/2003 | Draves | |
| 6,587,547 B1 | 7/2003 | Zirngibl et al. | |
| 6,611,516 B1 | 8/2003 | Pirkola et al. | |
| 6,687,743 B1 | 2/2004 | Innes | |
| 6,768,994 B1 | 7/2004 | Howard et al. | |
| 6,836,730 B2 | 12/2004 | Root et al. | |
| 6,873,858 B1 | 3/2005 | Aguilar et al. | |
| 6,885,872 B2 | 4/2005 | McCann et al. | |
| 6,925,307 B1 | 8/2005 | Mamdani et al. | |
| 6,944,447 B2 | 9/2005 | Portman et al. | |
| 7,248,872 B2 | 7/2007 | Bassett et al. | |
| 7,787,445 B2 | 8/2010 | Marisco | |
| 7,787,872 B2 | 8/2010 | Minborg et al. | |
| 7,925,243 B2 * | 4/2011 | McGary | 455/414.1 |
| 7,996,023 B2 * | 8/2011 | McGary et al. | 455/466 |
| 8,200,262 B2 * | 6/2012 | McGary et al. | 455/466 |
| 8,238,951 B2 * | 8/2012 | McGary | 455/466 |
| 8,374,639 B2 * | 2/2013 | McGary | 455/466 |
| 8,412,169 B2 * | 4/2013 | McGary et al. | 455/414.3 |
| 2001/0044309 A1 | 11/2001 | Bar et al. | |
| 2002/0090934 A1 | 7/2002 | Mitchelmore | |
| 2003/0054844 A1 | 3/2003 | Anvekar et al. | |
| 2003/0193967 A1 | 10/2003 | Fenton et al. | |
| 2003/0211845 A1 | 11/2003 | Lohtia et al. | |
| 2006/0093120 A1 | 5/2006 | Thorpe et al. | |
| 2006/0166655 A1 | 7/2006 | Montemer | |
| 2007/0123280 A1 | 5/2007 | McGary et al. | |
| 2007/0237318 A1 | 10/2007 | McGary | |
| 2009/0005966 A1 | 1/2009 | McGary et al. | |

\* cited by examiner

| TRANSACTION RECORD ID 101 | USER FIELD 102 | DEVICE FIELD 104 | TIME AND DATE FIELD 106 | REQUESTED DATA FIELD 108 | RESPONSE MESSAGE FIELD 110 |

TRANSACTION RECORD 100

SYSTEM AND METHOD FOR PROVIDING MOBILE DEVICE SERVICES USING SMS COMMUNICATIONS

RELATED APPLICATIONS

This application is a continuation of U.S. patent application Ser. No. 13/198,945 filed on Aug. 5, 2011, now U.S. Pat. No. 8,412,169 which is a continuation of U.S. patent application Ser. No. 11/485,189, filed on Jul. 12, 2006 now U.S. Pat. No. 7,966,023 which in turn claims the benefit of priority from U.S. Provisional Patent Application Nos. 60/699,050, filed on Jul. 13, 2005; 60/783,612, filed on Mar. 17, 2006; 60/757,920, filed on Jan. 9, 2006; 60/763,949, filed on Jan. 30, 2006; 60/772,535, filed on Feb. 9, 2006; 60/786,834, filed on Mar. 28, 2006; 60/799,413, filed on May 10, 2006; and 60/799,719, filed on May 11, 2006, the entirety of which are incorporated herein by reference.

FIELD OF THE INVENTION

The present invention relates to mobile device services. More particularly, the present invention relates to directory assistance services using SMS/MMS/EMS (Short Message Service/Multimedia Message Service/Enhanced Message Service).

BACKGROUND OF THE INVENTION

In the field of mobile technology, such as cellular telephones and wireless enabled PDAs, etc. . . . , many services are available to the user's to enhance their experience. Some of these services mirror traditional telephone services such as directory assistance. Other services, such as downloadable ring-tones, videos, or music clips, are newer features that have been recently developed for the mobile digital device.

Another common feature on mobile devices is SMS or Short Message Service, also commonly referred to as text messaging. Currently, text messaging and other forms of mobile text delivery, wireless e-mail for example, are used mostly for short text communications between users, but have more recently been used to upgrade traditional services like directory assistance where a user is forwarded a text message of a requested listing after the operator provides it so they don't have to write the number down.

With ever increasing data transfer capacity in wireless networks, and with increased processing speeds and storage capacity in the mobile devices themselves, SMS and other text and related text and file transfer technologies have vastly improved capabilities. However, the services provided by the mobile carriers and other third parties have not kept pace with the advancing capacities of the mobile messaging and file transfer technologies, particularly in the field of directory assistance.

OBJECT AND SUMMARY

It is an object of the present invention to provide a system and method for offering mobile subscribers improved services, including improved two-way text directory assistance, using SMS and related technologies for communication and delivery of products and services.

To this end, the present invention provides for an enhanced services platform has an interface for receiving a communication from a user requesting a desired data. An automated response module parses the communication and retrieves the desired data. The enhanced services platform arranges the desired data into a response message that is sent to the user, where the response message includes an embedded code corresponding to a link allowing the user to re-contact the enhanced services platform. An operator assistance module receives communications from the user initiated via the link to provide further assistance regarding the user's request.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 3 illustrates an exemplary transaction record stored in the enhanced services platform from FIG. 2, in accordance with one embodiment of the present invention;

FIG. 12 illustrates a sample application for from the private banking process of FIG. 11, in accordance with one embodiment of the present invention;

DETAILED DESCRIPTION

Figure 1:
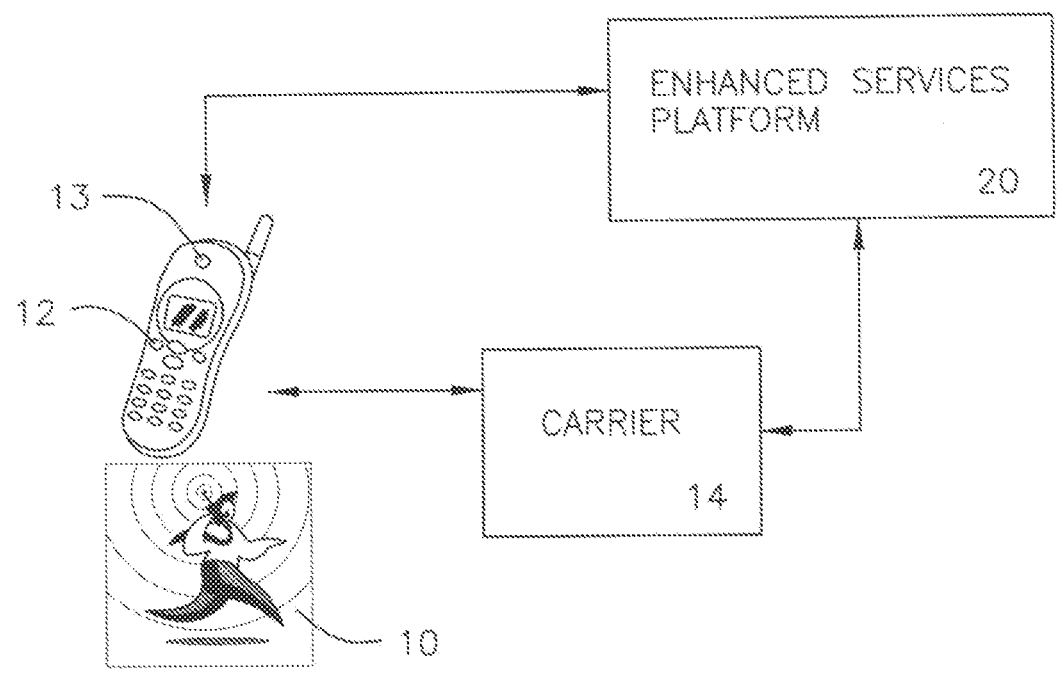
FIG. 1 illustrates a typical arrangement of user in connection with the enhanced services platform, in accordance with one embodiment of the present invention.

In one embodiment of the present invention, as illustrated in FIG. 1, a mobile user 10 employs mobile device 12 with camera 13 to contact an enhanced services platform 20, either through their mobile carrier 14 or directly through an internet connection or the like. For the purposes of illustration, mobile device 12 is discussed throughout as a mobile/cellular telephone. However it is understood that any communication device such as wireless PDA, laptops or other such electronic devices, may contact platform 20 and use the hereafter discussed services. Additionally, enhanced services platform 20 is understood to be interchangeable as both a portion/subsection of a larger pre-existing services platform such as a directory assistance platform, or alternatively as a stand alone system. In either case the inventive features discussed below are novel regardless of the architecture upon which they are offered.

Figure 2:
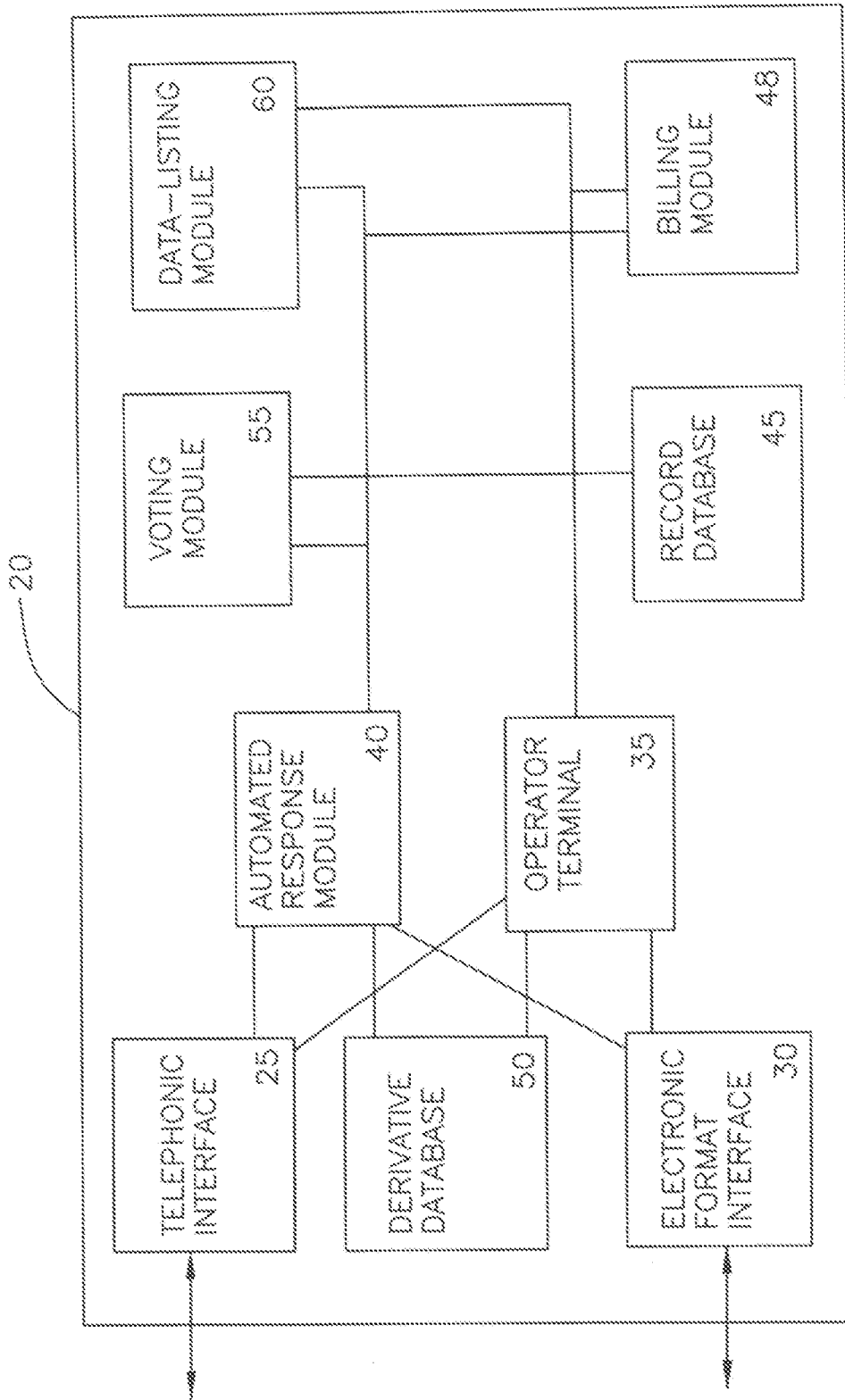
FIG. 2 illustrates an arrangement for enhanced services platform from FIG. 1, in accordance with one embodiment of the present invention.

In one embodiment of the present invention, as illustrated in FIG. 2, an exemplary enhanced services platform 20 is shown. The below described modules are intended only as non-limiting examples for illustrating the salient features of the present invention. For example, the modules described herein are done so to show their logical functions. However, certain alternative designs may incorporate multiple functions within a single module, or alternatively, a separate single function may be performed on multiple modules. Any similar system offering comparable services using similar modules is within the contemplation of the present invention.

Thus, in FIG. 2, platform 20 maintains a telephonic interface module 25, an electronic format interface module 30, an operator assistance module 35, an automated response module 40, a record database module 45, a billing module 48, a derivative user identifier database module 50, a voting module 55, and a data/listing module 60.

Telephonic interface module 25 is configured to receive traditional inbound voice telephone calls, whether wireless, wire line, VoIP or any other voice communication format. Telephonic Interface module 25 employs switches, trunk lines, call distribution software and other such devices incident to handling large call volumes to platform 20. Telephonic interface module 25 is coupled to both operator assistance module 35 and automated response module 40.

Electronic format interface module 30 is configured to allow users 10 to communicate with enhanced services platform 20 through electronic messaging formats including SMS, e-mail, HTML, WAP, IM . . . or any other types of text capable communication formats. Such connections may be wireless, via the internet or any other communications manner which allows data and/or text to be transmitted to and from platform 20. Like telephonic interface module 25, electronic format interface module 30 is coupled to both operator assistance module 35 and automated response module 40.

Operator assistance module 35 is configured to handle incoming calls to the system by live operator from either telephonic interface module 25 or electronic format interface module 30. Operator assistance module 35 can be any conventional live operator assistance arrangement, employing plurality of operators and a queuing system. Operator assistance module 35 may be located at a single location with numerous operators, or alternatively, the operators may be located in geographically separate locations, connected by T3 or other such high capacity telephone lines. Furthermore, operator assistance module 35 may be arranged so that in addition to live verbal communications, the operators may also be set up for live text communications such as live IM, Chat, etc. . . . should such communications to platform 20 be received via electronic format interface module 30. It is understood that in any instance through the present application when a live operator or live CSR (Customer Service Representative) is connected to, such communication may occur either by voice or in the above described live text formats.

In one embodiment of the present invention an automated response module 40 is coupled to both electronic format interface 30 as well as telephonic interface 25. In the case of incoming calls from telephonic interface module 25, automated response module is able to provide the user with pre-recorded voice questions, and receive verbal or keyed responses from user 10. Via such communications between user 10 and system 20, automated response platform 40 can accept a request from user 10 and contact listing/database module 60 to obtain the desired information or service the desired request as discussed below.

In the alternative situation, when automated response module 40 receives incoming calls from electronic format interface 30, automated response module 40 simply parses the text issued by user 10 as discussed below and contact listing/database module 60 to obtain the desired information or service the desired request. This information can then be forwarded back to user 10 via electronic format interface in the same or some other desired text format.

Record database module 45 is configured to store data corresponding to each transaction between user 10 and platform 20. This information is used by platform 20 when a user 10 or platform 20 wants to re-access a previous data or services request for any reason, such as if the first information given is either inaccessible or incorrect as discussed in more detail below.

For example, as illustrated in FIG. 3, for each transaction between user 10 and system 12, a transaction record 100 is generated having various fields including but not limited to a transaction record ID field 101, a user field 102 for identifying the user, device field 104 for identifying the device 12 used by user 10, time and date field 106 for storing the time and date of the user 10 request, requested data field 108 including the request from user 10, and delivered data 110 including the output from platform 20 to the mobile device 12 of user 10. The addition of other fields used for supporting the below described functions of platform 20 are also within the contemplation of the present invention.

Billing module 48 is coupled to record module 45 as well as automated response module 40 and operator terminal module 35 and is configured to track the two-way SMS sessions and record the appropriate billing information so that carriers 14 can appropriately charge users 10 as discussed in more detail below Derivative user identifier database module 50 is configured to store information about user 10 when they frequently contact platform 20. As a user 10 continues to contact platform 20 various habits of user 10 may be discerned and stored as a profile in database module 50.

Figure 4:
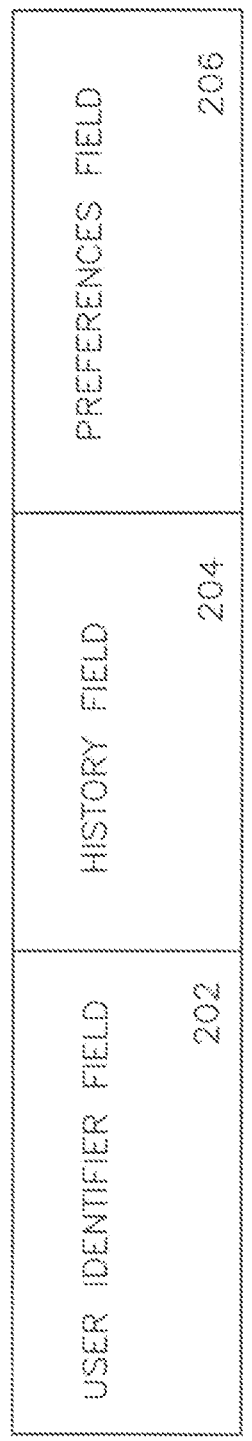
FIG. 4 illustrates an exemplary derivative user profile stored in the enhanced services platform from FIG. 2, in accordance with one embodiment of the present invention.

For example, FIG. 4 shows an exemplary derivative user profile 200 having a user identifier field 202, a history field 204, containing the history of past user 10 requests, and a preferences field 206. In one arrangement, preferences field 206 can be derived by algorithm from history field 204 contents. For example, if a user 10 calls platform 20 three times, and each time requests Spanish Language preference, such requests are stored in history field 204 and may be incorporated into a Spanish language preference for preferences field 206. Alternatively, a user 10 may contact platform 20 directly, via the internet, SMS or by wireless telephone call and the like, and directly set preferences in field 206.

As described in more detail below, when user 10 contacts platform 20, platform checks derivative user identifier database module 50 for an existing user profile 200. If none exists, then platform 20 processes the call as a new user. If a profile 200 does exist for this user 10 then their preferences from field 206 are utilized to handle the incoming request and their current request is added to the history field 204. Such actions allow platform 20 to handle incoming calls or text messages faster and with better accuracy.

It is understood that preferences field 206 may include any number of preferred actions, including how user 10 is handled when they contact platform 20, to what type of services (directory assistance, download features, other services, etc. . . . ) user 10 frequently requests.

In one embodiment of the present invention, a voting module 55 is included in platform 20. Voting module 55 is configured to allow all of the users 10 for platform 20 to have their votes recorded on various questions or in promotional contests as described in more detail below.

In one embodiment of the present invention as illustrated in FIG. 1, a data listing module 60 is connected to both operator assistance module 35 and automated response module 40 and configured to allow those modules to look up and respond to the request of user 10.

For example, in a standard directory assistance request, either by telephone call or SMS, platform 20 receives the request and looks up the contact information from data listing module 60. In another example, when user 10 requests a downloadable or executable file, likewise this information or its address is stored in data listing module 60.

It is understood that data listing module 60 is only intended as a sample of a data storage module. However, given the vast sums of data required to implement even a common directory assistance system, let alone the additional search and download features described below, data listing module 60 is contemplated to be either located in-house in part or in whole or alternatively located remotely, possibly by a third party, also in part or in whole. It is also contemplated that the data listing module 60 may not store the data or listings themselves but rather simply store addresses on various third party systems, that correspond to the requested data. Any such configuration or combination of configurations that allows platform 20 to find requested data or listings is within the contemplation of the present invention.

Figure 5:
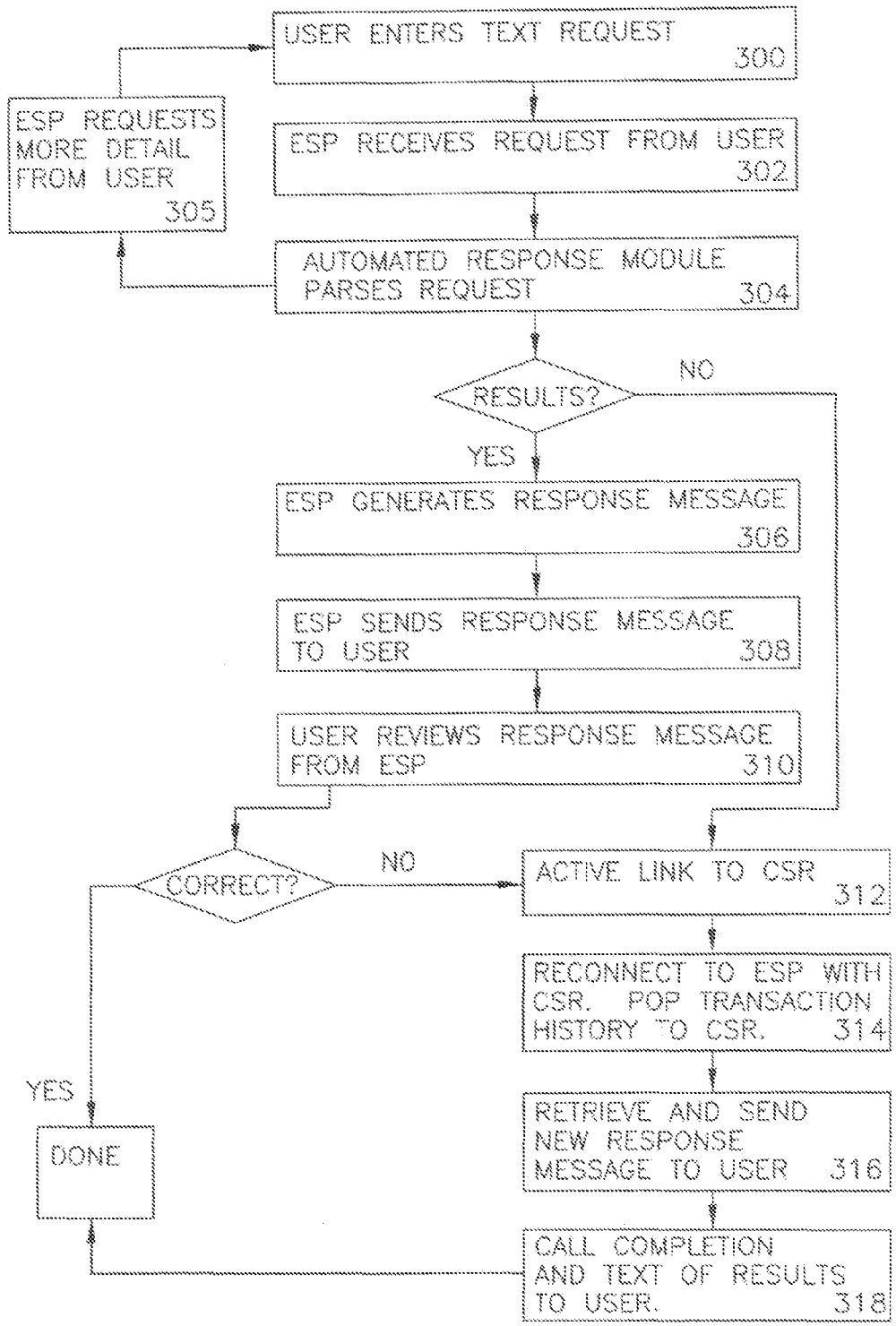
FIG. 5 is a flow chart for two way SMS directory assistance via the enhanced services platform from FIG. 2, in accordance with one embodiment of the present invention.

Turning now to en exemplary interaction with enhanced services platform 20, as illustrated in FIG. 5, a user 10 contacts platform 20 by SMS to receive traditional directory assistance such as the telephone number, either wireless or wire line, of a second party. It is noted that SMS is used throughout for example, but the present invention is equally applicable to all forms of mobile text communications, including MMS and EMS.

To this end, enhanced services platform 20 is configured to provide the directory assistance entirely by two way text (SMS) communication with user 10 and to further provide a live operator option if the need for additional assistance should arise.

Such a two-way SMS service on platform 20 allows user 10 to search business, residential, and government listings from a National Directory Assistance and International Directory Assistance database via SMS. Platform 20 also searches enhanced listings in listing data module 60 such as category searches, reverse searches, movies, sports, stocks, directions, etc., and delivers the content via SMS text messaging to user 10. It allows user 10 to send and receive requests in both English and other languages such as Spanish, delivering formatted text data to the carrier's 14 SMSC (Short Message Service Center) via SMTP (Simple Mail Transfer Protocol) or SMPP (Short Message Peer-to-Peer) protocol through a VPN (Virtual Private Number) connection with the listing information containing the listing name, phone number, address, and back-end marketing message as discussed in detail below. This service integrates with third-party SMS aggregators, should the direct connect method not be available through carrier 14.

It is understood that such SMS searches are not limited solely to direct telephone number look-up, but may also include category searches, reverse searches, movies, sports stocks, directions and the like. It is assumed that the below described operation may further be enhanced by using location data, either provided directly by user 10 or by some other auto location system in device 12 such as GPS (Global Positioning System) so that nearest to me requests can be made.

Furthermore, in the present example, user 10 requests a traditional directory assistance request. However, this is in no way intended to limit the scope of the invention. Numerous other features beyond traditional directory assistance are described below in later examples, but the features and steps used for two-way SMS communication between user 10 and platform 20 expressed herein are equally applicable in the later examples.

Thus, in step 300, user 10 generates an initial SMS request and sends it to platform 20, with the desired request. If the message is sent through carrier 14 they may dip the LNP database prior to sending the text message to ensure that it goes to the appropriate address. Next, at step 302, electronic format interface module 30 receives the incoming SMS message and forwards it to automated response module 40 for initial processing of the request. Additionally, platform 20 may review preferences field 206 of stored profile 200 and apply any preferences that are applicable to the request such as Spanish language. It is noted here that although the present example envisions an SMS or text message from user 10, as noted above, automated response module 40 is capable of handling incoming voice calls in an automated manner as well. It is understood that the following operations of parsing including parsing voice requests in step 304 and 306 conducted by automated response module 40 are also within the contemplation of the present invention.

At step 304, automated response module 40 parses the request and contacts listing data module 60 to determine if platform 20 maintains the desired listing. Automated response platform, as it is parsing text data from user 10, maintains numerous algorithms to resolve the request.

Automated response module 40 is flexible enough to accept partial words, cities, etc. Text requests have a tendency to be error prone but need to be adaptable to recover with minimal impact to user 10. Error correction is executed when user 10 makes mistakes that are easy to detect. Examples include simple typographical errors, duplicate localities, mismatched zip codes, etc. . . . Automated response module 40 may even send some suggestions to correct the mistakes and allows user 10 to select among multiple choices.

User 10 can search for listings in a variety of different ways which are preferably not case sensitive, Locality searches are flexible enough for user 10 to request listings by city, neighborhood, state, area code, zip code, or a combination of the afore-mentioned.

| | |
|---|---|
| a. Business Name | Locality |
| b. Residential Name | Locality |
| c. Gov't Office | Locality |
| d. EDA | Locality |

EXAMPLES

| | |
|---|---|
| a. starbucks | nazareth, pa |
| b. john smith | nyc |
| c. police | new jersey |
| d. star wars | 18017 |
| e. delis | 212 |
| f. Italian restaurants | little italy, ny |

DA Residential queries can be made in the following ways:
First name, last name, city, state
First name, last name, state
First name, last name, area code
First name, last name, zip code
Phone number (NPA-NXX-NNNN)
Last name, first name, city, state
Last name, first name, state
Last name, first name, area code
Last name, first name, zip code
Last name, city, state
Last name, state
Last name, area code
Last name, zip code Other options are available for user 10 to text requests using listing codes, such as 'bus', 'res', 'gov', and 'eda' for their listing. An 'eda' code includes the entire suite of enhanced services such as, but not limited to category search, reverse search, movies, restaurants, weather, stocks, sports, events, and directions.

Example

| | |
|---|---|
| a. bus dr smith | bethlehem, pa |
| b. res dr smith | bethlehem, pa |
| c. gov court clerk | easton, pa |
| d. mov star wars | bethlehem, pa |
| e. sports yankees | nyc |
| f. rev 610 997 1000 | |

In the event the text request from user 10 is ambiguous and/or returns too many listings, at step 305 users may be presented with the option to narrow their search before being given the option to connect to a live operator for additional help.

For example, a message such as: "Too many listings. For business-press 1, residence-press 2, government-press 3, and enhanced service-press 4." may be sent if necessary.

Specifically, during the parsing process, automated response module 40 constantly polls the incoming requests looking for new user 10 directory assistance messages to process. Preferably every five seconds, automated response module 40 looks for new messages. If new messages are present it delivers the message processing thread. The processing thread determines which handler or subroutine that must be used to process this request based on certain criteria. For example, for calls processed in the United States, there is a need to determine that there is a U.S. request to choose the correct handler. Various handlers or subroutines are supported by the system for handling all manner of text requests.

The processing thread of the automated response platform cleans the incoming text of punctuation and unnecessary spaces. Once the message is cleaned, it is broken out into an array of words contained in the message. From these words valid locality/state combinations are determined, and these words are flagged as such. Each one of these combinations is then deemed a search. A zip code translates out to a locality/state combination and produces a search. Out of the remaining words the handler function of the automated response module 40 checks if a street identifier is present, such as Road, Rd, Avenue, Ave, etc. If the street identifier is present, it and the preceding word are flagged as such. The remaining words are flagged as possible keywords for the search. Next, each search is checked to see if it is a category search. If every keyword in the search in order matches a category header the search is tagged with the category ID.

Once all searches are determined with their fields, they are employed for a request, and the results of the searches are compiled together. Each search is run in multiple ways depending on the available information. Each request search can generate one or two Business, Category, Residential, and Government searches.

Thus in this example, each component of the parsed request is run against database 60 as a separate search, resulting in numerous lists of responses that each has a number of results. Each result list is run through a filter as discussed below.

After all the returned listings are grouped together a series of filters is run against them until the count is preferably between 1 and 3, no listings are left, or all filters have been run. If the ending counts are not between 1 and 3 the found locality information is pre-pended to the request text, and the request is issued to a customer service representative at operator terminal module 35 or a "could not process" message is sent with a link to an operator. Otherwise the remaining listings are stored in record data base 45 and the request is marked as processed.

It is understood that the above example is only one example of a parsing method used by platform 20. However, any parsing process capable of breaking down a text request from user 10 and retrieving a corresponding set of desired listings is within the contemplation of the present invention.

Returning to the exemplary parsing process, the above described filters employed by automated response module 40 may include but are not limited to:
1) Non-Published numbers are left out;
2) Listings without phone numbers are left out;
3) Duplicate listings with the same phone number are removed based on weighting. Certain providers receive a higher weight than others, in the order LSSSI/INFOUSA/MANUAL/GOVERNMENT; and
4) Listings that contain the words "Customer Service", "Main Number", "Main Info", and "Reservation" are given priority.

Subsequently, if the request is resolved and a corresponding listing is uncovered, then platform 20 proceeds to step 306. Alternatively, if the request can not be resolved and no corresponding listings are found then platform 20 sends an SMS that states that the request can not be resolved along with an embedded link 406 and the process skips to step 312.

Figure 6:
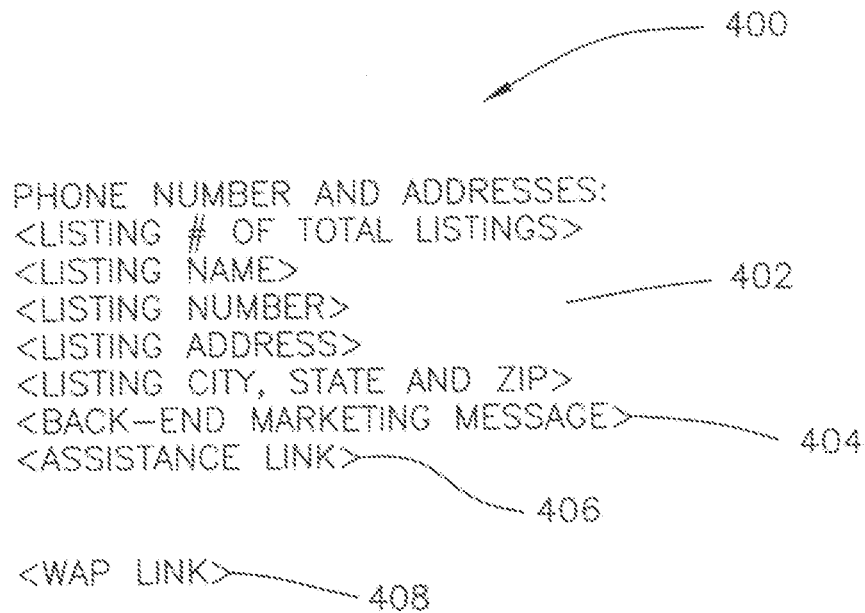
FIG. 6 illustrates a response message from the enhanced service platform from FIG. 2 to the user, in accordance with one embodiment of the present invention.

At step 306, assuming the request is resolved, platform 20 generates a response SMS 400 to return to mobile device 12 of user 10. As shown in FIG. 6, response SMS 400 typically includes the requested listing 402 and possibly some additional promotional material or information 404 if the request was for a commercial listing.

A typical SMS response message 400 to be sent to mobile device 12 of user 10 may have the following form:

```
Phone Number and Addresses:
<listing # of total listings>
<Listing Name>
<Listing Number>
<Listing Address>
<Listing City, State and Zip>
<Back-End Marketing Message>
<assistance link>
```

One or more responsive listings may be included in response SMS 400, particularly if more than one request meets the desired search criteria. In fact, if numerous listings meet the desired criteria multiple response SMS messages 400 may be sent.

Search results may also include the distance to the listing from the center part of the requested locality, defined from the position of user 10.

For example:

```
Starbucks       0.5 mi
484-373-0510
3712 Easton-Nazareth Hwy
Easton, PA 18042
```

Listing limits are performed when the number of listings is too many, so that it exceeds the number of listings (to be determined by the customer, typically 3) and requires further input from user 10 to narrow the search.

The following are additional examples of SMS responses 400 to two-way SMS directory queries. A request for a nearest hardware store may result in a two listing responsive SMS message 400

Example

```
1 of 2
Home Depot      0.5
215-537-6100
4640 Roosevelt Blvd.
Philadelphia, PA 19124
Call 411 for movie listings, show times, and NOW TICKETS!
2 of 2
Home Depot      1.0
215-744-1128
2615 Castor Ave.
Philadelphia, PA 19140
How do I get there? What time is the show? . . . Call 411.
```

Example response message 400 for medical listing with caption:

```
1 of 1
Fox Chase Cancer Center    1.5
Institute for Cancer Research
215-728-6900
333 Cottman Ave.
Philadelphia, PA 19019
Call 411 for Gift Shops, Florists, Restaurants and More!
```

The following is another example of user 10 response message 400 to a directory assistance request for a nearby Starbucks® coffee shop using the text search "starbucks downtown nyc"

Caller receives following text messages:

```
1 of 3
Starbucks       1.5
212-513-1006
100 Church Street
Manhattan, NY 10007
Call 411 for movie listings, show times, and NOW TICKETS!
2 of 3
Starbucks       2.1
212-677-6447
51 Astor Place
Manhattan, NY 10003
How do I get there? What time is the show? . . . Call 411.
3 of 3
Starbucks       2.5
212-269-8717
45 Wall Street
Manhattan, NY 10005
How do I get there? What time is the show? . . . Call 411.
```

In one embodiment of the present invention, response message 400 may include WAP (Wireless Application Protocol) pushes to mobile device 12. For example, user 10 looks for the closest Starbucks, but does not know how to get there. Response message 400, in addition to the basic information described above may include a WAP link 408 to a WAP page with driving directions, maps, business hours, etc. specific to that listing.

In another embodiment of the present invention, assuming the WAP link 408 is included with response message 400, platform 20 may further implement alerts with regard to the WAP function. For example, if a user requests WAP directions to be pushed with response message 400 in WAP link 408, this function may further include an alert function tied to the location of mobile device 12 as derived from an auto location ability (e.g.) GPS. As mobile device 12 and its user 10 approach a location where a turn or other change is about to occur, either device 12 itself via the WAP application or platform 20 may alert the user to check the provided directions so they are aware that the change or turn is about to occur in the directions.

In another example, WAP link 408 in response message 400 for alerts may be used in conjunction with calendar software. User 10 may employ an Outlook® calendar or other such software which can be synched with platform 20. When away, user 10 may employ their mobile device 12 to send an SMS text message to platform 20 requesting to see their calendar. In response platform 20 may send a response message 400, including a series of hyperlinks for each of the calendar entries within some predefined timeframe. If the user presses a hyperlink related to one of the calendar entries, user 10 is instructing platform 20 to issue an alert regarding that entry. For example, if user 10 clicks on link for a meeting, the alert may function as a reminder SMS or call one day or several hours prior to the meeting. If the link is to an appointment calendar event, then the alert may be a reminder but may also include traffic alerts on the day of the appointment notifying user 10 that they need more time to make the appointment. As with the other SMS messages 400 described above, both the calendar requests and the alerts maintain a transaction record 100 and a embedded link 406 for operator assistance should user 10 need to contact platform 20 for additional live operator assistance.

Regardless of the listings requested and delivered, at the same time response SMS 400 is being generated, platform 20 further updates history field 204 of user profile 200 and also generates a transaction record 100 to be stored in record module 45.

As noted above, included within response SMS message 400 is a link 406 or other hot button command, that allows user 10 to reconnect to platform 20 in the event that the requested data 402 is incomplete, incorrect or inaccessible. FIG. 6 illustrates a typical exemplary responsive SMS message 400 with embedded link 406 included.

In one embodiment of the present invention, enhanced services platform 20 maintains the ability for user 10 to request live operator assistance in the event that user is having difficulty obtaining their requested information or if the information in response message 400 is wrong or incomplete.

Link 406 is preferably constructed as either a hyperlink, or "live command" link within response message 400 which upon clicking or activating directs device 12 to initiate a return call to platform 20. Alternatively, link 406 may be a command or other such instruction to device 12 that allows user 10 to voice command to reconnect to platform 20. Yet another option is that link 406 issues an instruction to device 12 to make a creation button a "hot button" to call back to platform 20.

Platform 20 also has the ability to proactively ask user 10 directly during the automated two-way SMS session if they would like to speak to an operator based upon the trouble they are having with obtaining their request. This further requires platform 20 to track the queries back and forth via the text, and recognize that user 10 is having difficulty.

Aside from the ability for link 406 to instruct mobile device 12 to contact platform 20 upon its activation, link 406 also includes an embedded code, such as the information from transaction ID field 101 of transaction record 100 for the two-way SMS transaction that resulted in that response message 400. It is noted however, that the embedded code is not limited in that respect to transaction ID 101, but any such manner in which platform 20 can recognize a prior user 10 two-way SMS transaction when user 10 re-connects through link 406, such as using ANI (Automatic Number Identifier) or combination of other embedded session IDs are all within the contemplation of the present invention.

At step 308, platform 20 sends response message 400 to mobile device 12 of user for their review. Next, at step 310, user 10 reads message 400 and utilizes the information accordingly. If the information is correct, then the operation is complete. However, if the information is incorrect or incomplete, user 10 activates link 406 in a manner outlined above.

At step 312, if user 12 clicks on the provided link then at step 314 reconnects them to operator assistance module 35 of platform 20. As noted above, link 406 includes an embedded code such as the transaction ID 101. When user 12 clicks the link to re-connect, a packet is also generated that includes the transaction ID) 101 or other such session identifying code. Upon receiving the incoming call/messages from link 406, embedded link 406 having already sufficiently generated a session identifying packet, allows platform 20 to retrieve a copy of transaction record 100 corresponding to the transaction ID 101 for the initial session. This transaction record 100 is forwarded to the operator at operator assistance module 35 in their pop screen so that they will not have to rehash the entire original SMS request with user 10. Such reconnected communications can occur as either a voice telephone call or as a live text/IM session.

For example a typical exchange between user 10 and operator assistance module 35 may go as follows:

User 10 may simply click on embedded link 406 that has the function of connecting or dialing to a live operator at platform 20 or use some other hot button or voice command associated with link 20.

| | |
|---|---|
| (312) System-- | <TONE> "Welcome to Directory Assistance." |
| System-- | "One moment please while you're connected to an operator." |
| (314) CSR-- York | "I understand you're looking for a Starbucks in downtown New City." |
| Caller-- | "Yes. Can you tell me the closest one to where I'm at, please." |
| (316) CSR-- | "Yes, I located your location and found a Starbucks on Varick Street between Vandam and Dominick Streets." |
| Caller-- | "Great, thanks!" |
| CSR-- | "Thank you, have a nice day." |
| (318) System-- | "Thank you, a text message of this listing is being sent to you now. Please hold while your call is connected at no additional charge to 646-xxx-xxxx. Thank you for calling Direct |

Thus, at step 316 platform 20 is able to retrieve a new or better listing from listing data module 60 and forward it to mobile device 12 of user 10 without the need for repeating the initial SMS text request of user 10 and without resending already known bad or incomplete information.

Again, as seen in the above example, at the end of the operator session after linking back to platform 20, at step 318, user 10 may be automatically connected to the desired second party (call completion), they may simply have the new data sent or they may be connected and have a back-up new response message 400 sent.

Platform 20 has the ability to credit the user 10/carrier 14 for any customer service impacting issues such as wrong number, incorrect response text message 400, etc. Two potential forms of credit exist, either credits for user service issues through mobile originating text messages as well as mobile originating text messages with live operator assistance.

In one embodiment of the present invention, the above process for two-way SMS directory assistance further includes front end and back end marketing promotions, such as text messages related to the desired request. For example, if a user requests a particular listing, Starbucks® for example, then that proprietor may wish to push additional coupons or promotional messages along with response message 400. Other back end branding may be from competitors in related fields of business who purchase message space through auction in order to cross compete.

Front end branding and messaging may include text messages that cross promote other products within enhanced services platform 20 or may simply be a paid advertiser's text ad, sent immediately upon a user requesting data (step 300) so that user 10 may get the service for a reduced cost or free.

It is understood that these are just examples of associated branding with the above described two-way SMS directory assistance and are in no way intended to limit the scope of the invention.

In one embodiment of the present invention, session based billing may be employed by platform 20. This feature allows the correlation of each response message 400 with the original request from user 10. It enables service provider 14 to charge users per session as opposed to per message. Preferably any billing arrangements are simply coupled to record database 45 such that transaction records 100 which include both a transaction ID 101 and a user ID 102.

Non-billable events may include the following instances:

1) Customer responds to error message or must activate link 406 to correct an entry; and 2) Customer request lost due to connectivity issue, such as a dropped wireless connection.

Billable events may include the following instances:
1) Customer requests same listing within a configurable amount of time, (for example request same listing more than 24 hours after first request); and
2) Customer requests live operator.

Billing according to the present invention may include the following provisions:
1) Multiple texts included in one "search" may require the session to be binded the entire time the transaction is going back and forth;
2) Ability to bill/invoice carrier for each user 10 session;
3) Ability to bill/invoice at first "text rate" for a pure text session;
4) Ability to bill/invoice at second "live rate" for operator assisted sessions;
5) Ability to bill/invoice based on carrier and/or carrier market area;

It is understood that such billing information is derived and stored in billing module 48 and may use information derived from transaction record 100 in record database in the case of any questions regarding how a particular session should be billed.

In another embodiment of the present invention, enhanced service platform 20 may generate reports according to the following criteria:
1) Daily report indicating the total number of directory assistance text requests received, broken down by the type of request (business, residential, government, EDA, etc.), including the number of sessions per request and results provided to user 10;
2) Daily report indicating the number of instances in which a live operator was requested and results of that interaction;
3) Develop a reporting mechanism that identifies what, if any, user 10 impact, providing a text message of residential or business listings have to the percentage of calls for repeat numbers;
4) Identify directory assistance characteristics of SMS users 10, i.e. are SMS users heavy directory assistance users, do they call for repeat numbers, etc. . . . ;
5) Daily report indicating the number of directory assistance calls for a particular geographical market and the percent of users 10 who chose to have an SMS sent for the requested listing; and
6) Daily report indicating the number of failed attempts, i.e. SMS messages that were sent that were never received by the SMSC.

It is understood that the above example of a two-way SMS information request from platform 20 and subsequent correction by linking back to the platform 20 by using embedded link 406 is only one possible manner of employing such a process for SMS requests. Below are described numerous additional SMS request related services offered by platform 20. In each case, the above process for requesting, delivery, linking, and re-connection by link are equally applicable.

In one embodiment of the present invention, platform 20 is able to provide users 10 with object recognition and mobile tagging services. Utilizing newer mobile devices 12 with embedded image viewing screens and cameras users may be able to utilize a camera 13 in mobile device 12 in conjunction with platform 20 to further ease and enhance the ability of user 10 to obtain desired information about a particular object or location.

Figure 7:
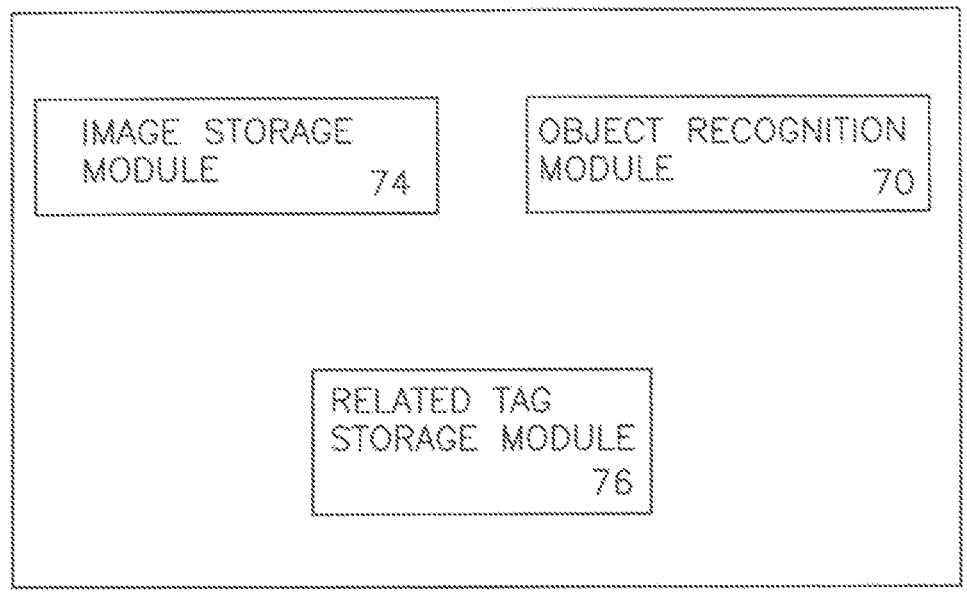
FIG. 7 illustrates linking data module from FIG. 2, in accordance with one embodiment of the present invention.

In one embodiment of the present invention as illustrated in FIG. 7, linking data module 60 further maintains an object recognition module 70 configured to compare images sent from mobile device 12 of user 10 against pre-existing stored images to determine the identity of the image provided by user 10 so as to allow platform 10 to provide information related to such recognized item as discussed in more detail below.

Also provided within linking data module 60 is an image tagging database 72 having an image storage module 74 and a related tag storage module 76. Image tagging database 72 is configured to allow user 10 to photograph an object and submit it to platform 20. User 10 may perform one of two tasks, either first they may add associated notes or "tags" to the image or alternatively they may have their submitted image recognized by other images stored in image storage module 74, to review associated tags in related tag storage module 76 and to see what others have written about the same image.

Beginning with object recognition, in an exemplary procedure for object recognition, the present invention provides a wireless application, and related method for providing a procedure to analyze images based on two-dimensional shape primitives. In the procedure, an object representation is created automatically from an image taken by user 10 and then this representation is applied to another image by object recognition module 70 for the purpose of object recognition.

The features used for the representation are the two-type of two-dimensional shape primitives: local line segments and vertices. Furthermore, the creation of object representations is extended to sequences of images, which is especially needed for complex scenes in which, for example, the object is presented in front of a structured background. Furthermore, using GPS or other auto location services in mobile device 12, platform 20 can greatly reduce the amount of stored images that need to be scanned against by limiting the object recognition to only other images that are in proximity to the geographic position of user 10. Furthermore the addition of a compass in mobile device 12 can also further reduce he amount of stored images that need to be scanned by further limiting the object recognition to only other images that are not only in proximity to the geographic position of user but taken facing the same or similar direction.

The process performed by object recognition module 70 which is typical of commercial object recognition software may include using a program that creates a model histogram of the people and objects that are desired to be identified in the image from camera scene. The image extracted is segmented into regions that correspond to a person or object whose identity it is desired to be determined for each region extracted from the image. A histogram is computed for the extracted region and an indicator is produced respectively of the degree of similarity between the extracted region histogram and each of the model histograms, forming exclusive combinations of the degree of similarity indicators where each combination is made up of one indicator associated with each extracted region of the image and each indicator in the combination is derived from a different model histogram. The combined degree of similarity value is computed for each of the indicator combinations and the largest combined degree of similarity value is identified.

Each extracted region is designated and used to compute the identified largest combined degree of similarity value. If this value exceeds a prescribed threshold corresponding to the object associated with the model histogram a particular person or object of interest is identified. These initial mode histograms are then assigned to the image cell where the centroid of their associated extracted regions reside. The extraction and histogram creation procedures are accomplished in the same manner as discussed above in connection with the description of the basic object recognition process.

Once the initial model histograms are created and assigned to the appropriate cell, the processing of "live" images of the scene can begin. Here again the segmentation of the live image to extract regions likely to depict a person or object of interest and the creation of a histogram from each extracted region proceeds as discussed previously. Each live image is then divided into the aforementioned plurality of cells. It is understood that the above is only one exemplary process for object recognition. However, any similar object recognition software or system, employed in a similar enhanced service providing platform are within the contemplation of the present invention.

Thus, according to one embodiment of the present invention, user 10 may be walking down the street looking for somewhere to have dinner, and stop outside a nice-looking restaurant, but there aren't many people inside. This may be because it is too early in the evening, but it still may lead user 10 to questions the service of the establishment. Utilizing the present invention, user 10 may take a picture of the restaurant and send it by SMS to enhanced service platform to see if the image can be parsed by object recognition module 70. If so, database 60 of platform 20 may be able to pull up a list of reviews associated with the recognized object and forward them to mobile device 12. The same can be done for monuments and tourist attractions, CDs, logos, billboard advertisements, etc. . . . It is understood that such a responsive SMS message 400 includes a link 406 for connection to a live operator at platform 20 for additional assistance as discussed in detail above.

In another embodiment of the present invention, user 10 may be able to photograph a store or commercial institution and message the photo to platform 20. Object recognition database 70, after recognizing the store may forward response message 400 to mobile device 12 allowing user 10 to accessing online stores, holiday guides, movie times, sale coupons, associated with the recognized object.

For example, if user 10 takes an image of store such as a Walmart®, platform 20 upon recognition of the image, may send sales coupons for the store in responsive SMS 400. In another example, if user 10 takes an image of a sports team logo from another persons baseball cap, platform 20 upon recognition, may send a link to the on-line store for that team in responsive SMS 400 so that user 10 may purchase a similar hat.

Figure 8:
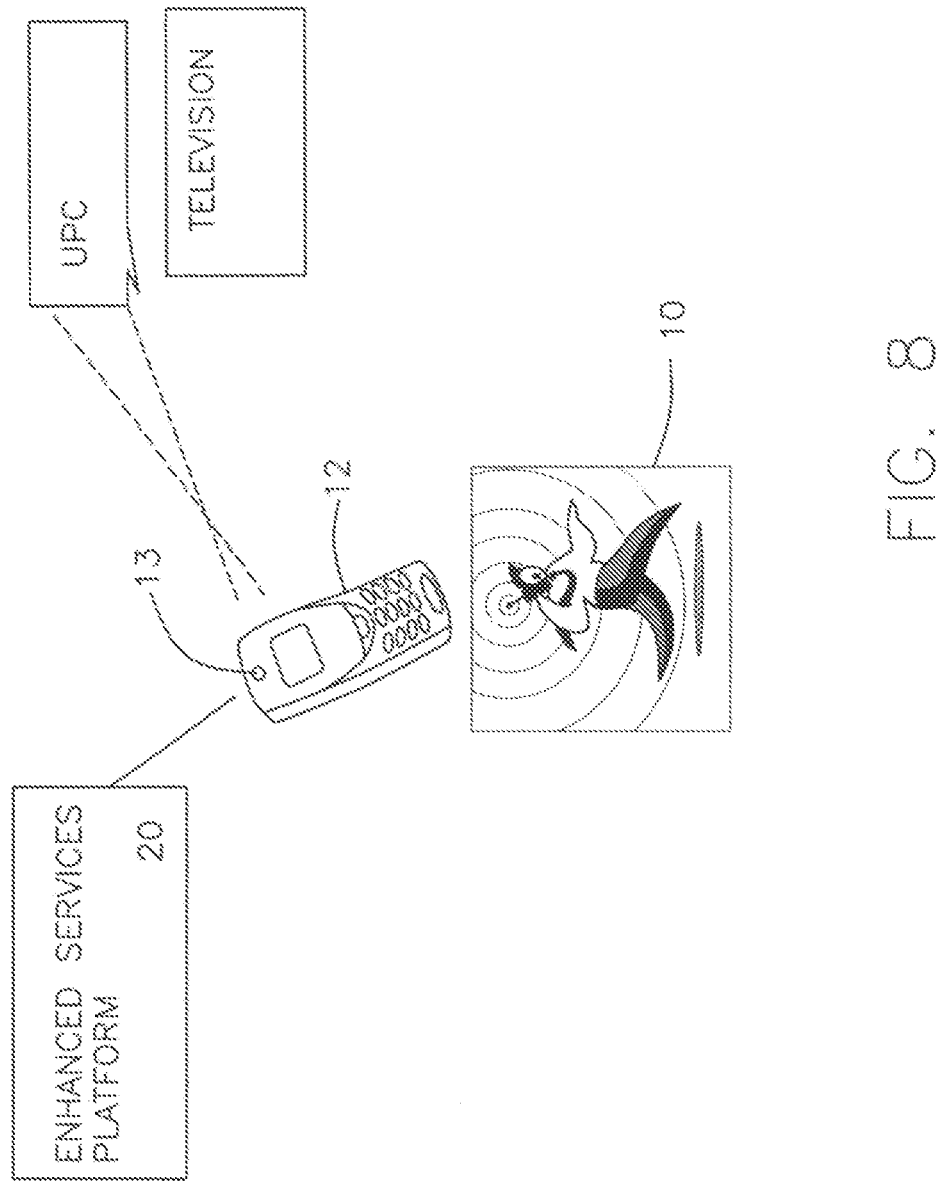
FIG. 8 illustrates a user and mobile device in an object recognition setting, in accordance with one embodiment of the present invention.

In another example, as shown in FIG. 8, user 10 may take a photograph of a UPC or bar code on a product inside of a store and then send it by SMS to platform 20. Once received, object recognition module 70 in platform 20 can pare the image of the bar code and allow automated response module 40 or live operator terminal module 35 to look up the product and forward response message 400 to user 10 including information about the product such as product specifications, reviews, prices, etc. . . . Regarding prices, user 10 may request that platform 20 compare the price in the store against those on the internet and include such information in response message 400. For example, if the bar code is for a TV, response message 400 may include prices from different retailers for similar products at other stores so that user may check on the relative price difference and be in a better bargaining position with the store.

Additionally, the responsive message may include links to product specifications, reviews or even additional cross promotional items such as paid advertisements from competing stores or TV brands. It is also noted as with all SMS inquires a transaction record 100 is created for the two-way SMS transaction between user 10 and platform 20. Responsive message 400 includes a link 406 for connection to a live operator at platform 20 for additional assistance as discussed in detail above.

In yet another embodiment of the present invention, object recognition module 70 may be used to recognize text within photographs which can be in turn converted to a search engine search by platform 20. This allows user 10 to carry out a much broader search, and it does not rely on a central text database of stored information. For example, if the user takes a photograph of the declaration of independence using camera 13, object recognition module 70 may not only search for other images that match but may actually convert a portion of the image to text and run a text search enhance the total quality of results provided to user 10 in response message 400.

In yet another example of object recognition, a user 10 may photograph a restaurant or hotel. When this information is sent to platform 20 and object recognition module 70 discerns the identity of the object, response message 400 may include WAP or HTTP functionality to obtain ratings for the establishment and even links for booking reservations through platform 20.

In each instance it is understood that the message sending for such object recognition services may employ any of the features outline above regarding two way SMS, such as embedded links 406 in response message 400 should object recognition module 70 not be able to recognize the object or alternatively provide incorrect information. User 10 can activate link 406 and be connected with a live CSR at operator terminal module 35 for further assistance.

Additional services contemplated to be supported by platform 20 in conjunction with object recognition module 70, may include among other services, being taken automatically to user's 10 favorite sports team's website when they take a photo of their logo, or a travel guide in response to a photo of a monument in a city.

Figure 9:
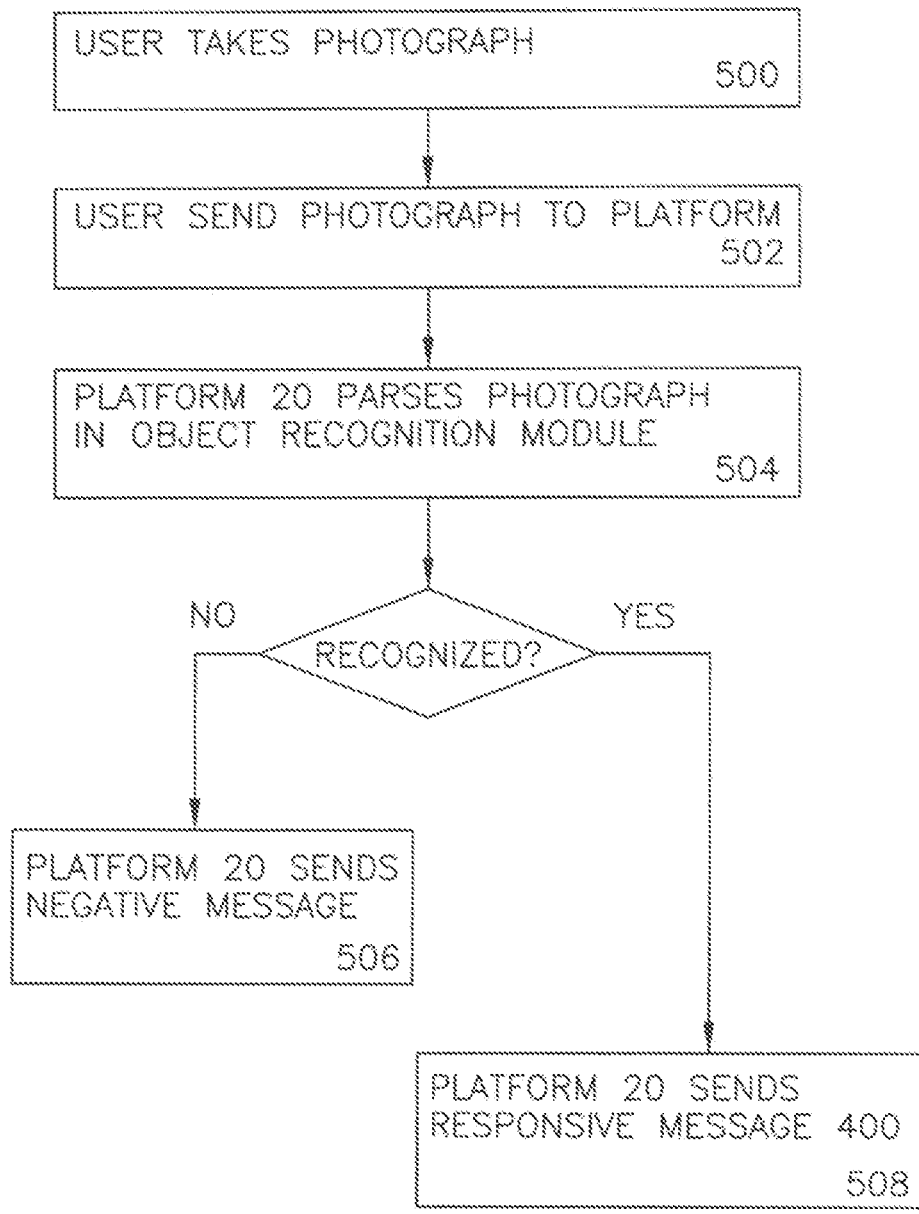
FIG. 9 is a flow chart for object recognition, in accordance with one embodiment of the present invention.

In an exemplary process, as illustrated in FIG. 9, user 10 may at a first step 500 take a picture of monument using their mobile device 12. At step 502, user 10 sends the message with attached image to platform 20 requesting object recognition services and attaches the image.

Next, at step 504, automated response module 40 receives the message, via electronic format interface module 30 and parses the request, forwarding the image to object recognition module 70.

If the image is not recognized, then at step 506 platform 20 sends a response message 400 to user 10 indicating that the image could not be recognized, with an embedded link 406 if user 10 would like live operator assistance.

However, if the object is recognized, at step 508, platform 20 sends a response message 400 to user 10 with some correlating information thereon. The correlated information is not limited in any respect, so long as it in some way is connected to the object recognized. In the present example of a monument, the corresponding information may be information about the monument, related historical attractions, comments from previous users 10 who have tagged the location and local paid advertisers, such as restaurants, that are near by etc. . . . The response message 400 still includes link 406 in case the corresponding information is incorrect or incomplete.

Turning now to mobile tag searching, the present invention contemplates a feature whereby images captured by user 10 using the phone on mobile device 12 are used to gain more information about that image from an analysis of historical data, such as a missing element in the image or identifying the image itself. Furthermore, the present invention contemplates searches of related images based on tags and sharing images with others, either nominated friends or the general public. Such a service offered by platform 20 would be in addition to other services, and would operate akin to mobile community, utilizing meta-data derived from all users 10 and stored within platform 20.

In operation, a mobile tagging service on platform 20 would begin by gathering/receiving tagged photographic input from all users 10 who are involved in the service. For example, at the point the image is taken from mobile device 12, there are three classes of data elements that are potentially captured in accordance with the present invention.

a) Temporal, for example the time that the image was captured;

b) Spatial—The GPS location or cell id of mobile device 12; and c) Personal/Social—Username (and other personal profile information which user 10 chooses to share), presence, any tags that user 10 has entered (text), other people in the vicinity (perhaps identified by Bluetooth), other places of interest recently visited etc.

The resultant photograph image is then stored in image storage module 74 and the related "tags" meta-data are stored in the related tag storage module 76. All of this associated data is referred to as a mobile tag associated with the image.

The data stored in image tagging module 74 and corresponding tag database module 76 may be enriched by data sources such as land registry data, mapping data etc. In this case, platform 20 may take the geographical component of the tagging data and possibly image recognition information from the image data and obtain existing documentation. Personal stored data within a personal portal page may also be assigned through arm operator service or directory assistance service. For example, if a user 10 takes a picture of Big Ben, platform 20 may utilize the GPS data of the tagged image and the object recognition to recognize that this is Big Ben and then supplement the tagged data by obtaining content from the web or other proprietary (advertiser) sources such as colorful maps of the area etc. . . .

Once the image is received and the meta-data tags are stored tagged data module 76 of platform 20 attempts to provide additional information about the image sent by user 10 using previously submitted tags from prior users 10, who sent similar images. Recognition of what tags to return to user 10 may be based on tags with similar GPS locations of user 10 at the time of the picture, on object recognition of the provided image, or any other manner that is likely to give relevant results to user 10.

For example, many users of this service on platform 20 send in images of Big Ben clock in London, each of which are tagged with GPS data of the mobile device 12 position, times and dates as well as notes from users 10. When a later user 10 sends in an image of Big Ben (also with associated tag data) platform 20 sends back a response message 400 concerning the tag data from other users.

Thus, according to this invention, user 10 need only photograph a landmark or a monument, restaurant, etc. . . . , and send the photograph to platform 20 as an attachment to an SMS. Immediately user 10 will receive back a wealth of tag data from previous photographers of the same site, possibly including the name of the site, notes on other local attractions, commentary on the history of the monument etc, exact location, and other amount of diverse user based and user generated data.

The tag data returned to mobile device 12 of user 10 is presented as a series of hyperlinks, each relating to a different tag. The images and associated text data may be arranged in the returned SMS in some order based on size, date, relevance, or even on a usefulness scale that is generated by feedback from other tag users such as best previous picture or most useful commentary on the area.

With this meta-data from other users 10, the 'river Thames' and 'House of Parliament' could be identified to the person capturing the third image. This is because potentially other users 10 would have captured separate images of the three points of interest and tagged them accordingly.

Thus, if the third user 10 wanted to know 'the river in the image' or the 'building in the image' they would be presented with a likely set of related points of interest which could include the river Thames and the House of Commons.

In another embodiment of the present invention, sharing of personal information through the tag process may include an "air graffiti" feature, whereby users 10 can 'pin' digital 'post it notes' at any physical (geographic) point. For example, if user 10 was at a holiday destination and took a picture or a video of that location, that user 10 sends the image to platform 20 along with 'posted' notes stored in the tag data. Those specific comments are made accessible to the user's 10 'friends' who are other users 10 of this service on platform 20. Some time later, another users 10 designated as friends may come to that same place and as they walked by the location, platform 20, monitoring the location of mobile device 12, would recognize a tag from tag database module 76 for that location (in proximity) and a response message 400 would be sent to device 12 with the notes and the related picture from image tagging database 74.

Figure 10:
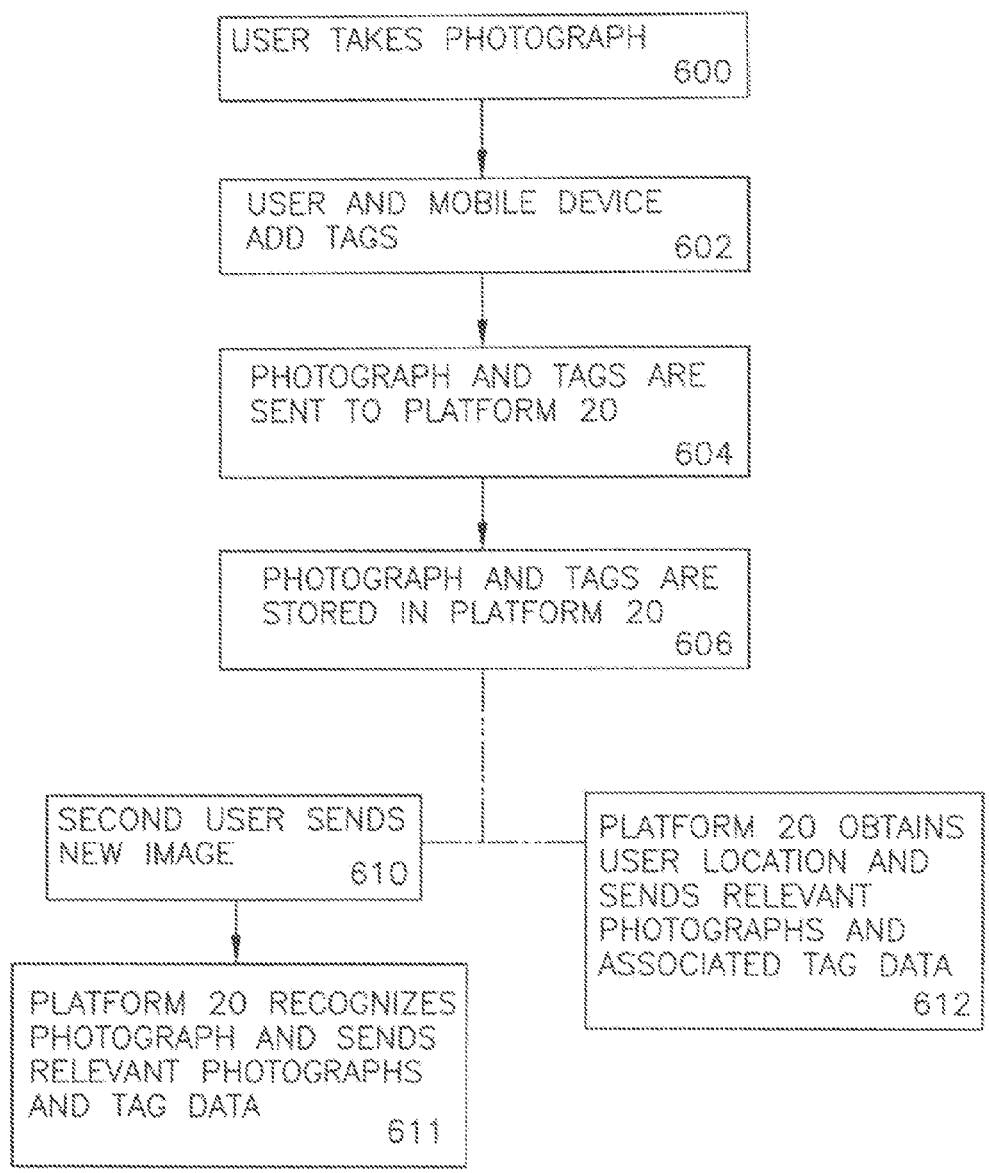
FIG. 10 is a flow chart for mobile tagging, in accordance with one embodiment of the present invention.

Thus, in an exemplary process for using the image tagging service platform 20, as illustrated in flow chart FIG. 10, at a first step 600, user 10 takes a photograph of some object, and at step 602, tag meta-data from device 12 is associated with that image, such as time and date, location and/or personal notes and comments entered by user 10. At step 604, user 10 sends a text or SMS message to platform 20 including the image and tag data as an attachment to be stored in image storage module 74 and corresponding tag storage module 76. Finally, at step 606 platform 20 aggregates the image and corresponding tag data from various users 10 so that corresponding data for geographically similar regions are related in some way to one another.

In a subsequent action beginning at step 610, a user, not necessarily the same user from steps 600-606 but any user 10, may access the tag meta-data by taking a photograph and sending by text to platform 20. At step 611, using object recognition module 70 and preferably geographic data of user 10 (GPS from mobile device 12) as well, platform 20 collects data to send in text format back to user 10 in a response message 400. The data included can be other pictures of the same object by other previous users 10, related tag data for the image, other images of near-by locations and their associated tag data, etc. . . .

In a separate manner for accessing tag meta-data, at step 612 user 10 may simply indicate that they have physically entered or be monitored by platform 20 physically entering a geographic location for which prior users have taken images and associated tag data, stored in image tagging database 74 and corresponding tag data database 76. At step 614, upon receiving information that user 10 is in a given location, platform 20 can retrieve corresponding image and associated tag data for that location and forward it to user 10 as a hyperlink in a response message 400.

It is understood that in either case of step 610/611 of 612, response message 400 includes a link 406 that allows users to connect to a live operator at operator assistance module 35 for more information, should response message 400 be incomplete or incorrect as discussed in detail above. Such instances may include the recognized image being obviously incorrectly identified and the like.

In one embodiment of the present invention, a private bank may utilize platform and the above described two-way SMS features, allowing platform 20 to act as an intermediary for accepting credit card applications submitted with images of the user's 10 photo identification, user's 10 photo social security card, and driver license images required for the application being sent via SMS/MMS on platform 20 by. Necessary photos can be generated by simply using the built in camera 13 feature of mobile device 12.

Thus, a credit card offer could go out through platform 20 and user 10 could complete the credit card application, send a photo of themselves, a photo of their drivers license and social security card back through by secured and encrypted 2 Way SMS/MMS to the platform 20. This data is then stored in a side third party directory of database 60 managed by platform 20 until it is sent to the issuing bank for processing.

The notification of card approval is sent back DA platform 20 and in turn to user 10 by SMS/MMS with the same link 406 included in all response messages 400. Should issues arise with the retrieval of information, a live operator is able to speak to user 10 who activates link 406, and where transaction record 100 is automatically popped (pre-entered) to the operator's terminal so they will already know the nature of the call.

An additional use for such a feature can simply be for merchant security, for example, mobile device 12 may be capable of facilitating commercial transactions via SMS. As a security measure, the merchant may request via platform 20 that user 10 send a picture of themselves or their drivers license. Based on prior SMS settings, user 10 can take a picture of themselves or ID and SMS back to platform 20 by copying and pasting the hyperlink sent by platform 20 in the request. Once the picture is taken, user 10 sends it back, copies the hyperlink, and pastes it to the forwarding address for the picture. The picture is sent and assigned to the proper transaction record 100/transaction ID 101. Once the picture is approved the merchant receives an approval code and authorizes the commercial transaction.

Figure 11:
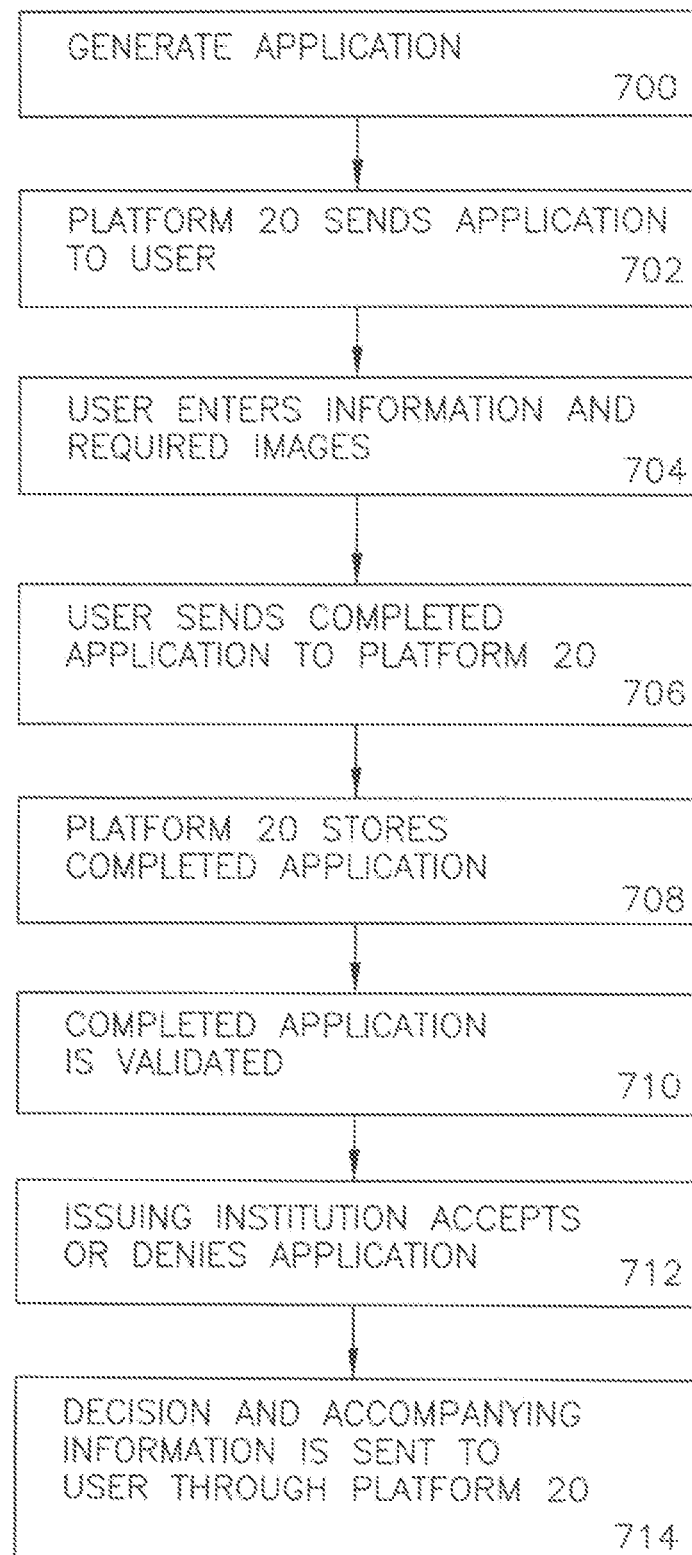
FIG. 11 is a flow chart for private banking, in accordance with one embodiment of the present invention.
Figure 12:
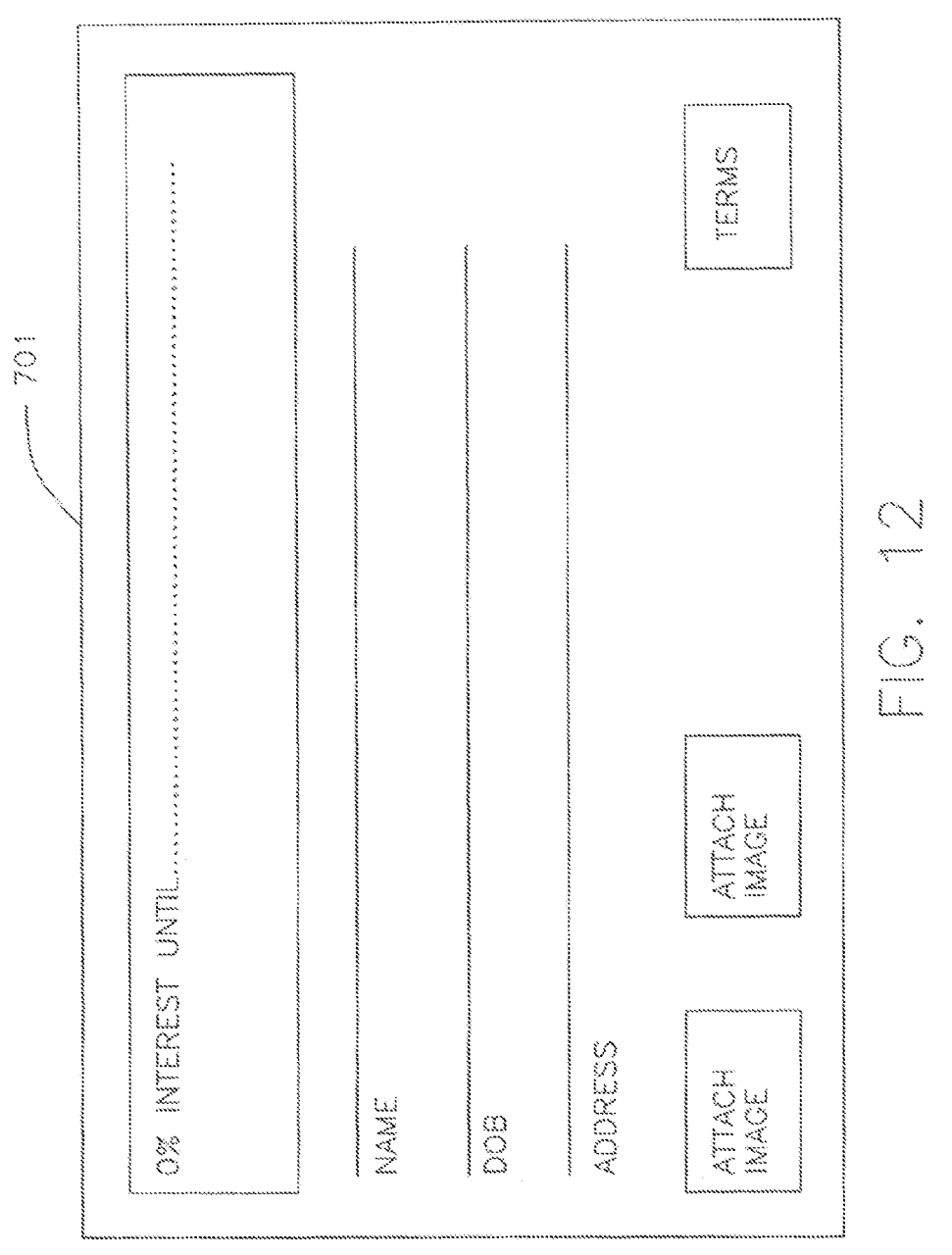

As illustrated in flow chart FIG. 11, at a first step 700 in an application process, an issuing bank generates an application 701 for user 10. A sample application 701 is shown in FIG. 12. At step 702, platform 20 forwards this message by MMS text to mobile device 12 of user 10. It is noted that this application for that is sent to user 10 may be in a WAP format, or other template format, or alternatively it may imply be a free from text application.

Next, at step 704, user 10 enters the requested information and, at step 706 sends it by secured text message back to platform 20. At step 708 the completed text application is stored in database 60 and then later sent to or retrieved by the party that generated the application. At step 710, the information is validated by either administrators from the bank or from platform 20 in some manner to check its authenticity, such as by using a registered e-mail account, accessing a social security number derivative database having a list of valid social security numbers and comparing the input address with the at least one retrieved stored address to corroborate the information.

At step 712, the issuing bank either accepts or denies the application, notification of which is sent at step 714 by way of a response message 400 sent by platform 20. As with the other applications described above on platform 20, a link 406 is send in response message 400 so that user 10 may link back to a live operator at platform 20 with any questions, with link 406 providing sufficient information to platform 20 to pre-populate the operator terminal with transaction record 100 including the earlier application messages to and from platform 20.

In another embodiment of the present invention, additional options that are employed in the banking/card applications may include the ability for user 10 to send an e-mail to platform 20 in which they desire that that the recipient confirms that they received it and read it, similar to registered mail from the postal service. Here the e-mail would be sent via platform 20 using a special e-mail server. User 10 first sends the e-mail, with address information, which is in turn received by platform 20. A notice is generated and sent to the intended recipient. The recipient opens the message sent by platform 20, and must click a link to download the original email. User 10 is sent a message in return from platform 20 letting them know that if the recipient chose to read the message or ignore it. Preferably both parties including user 10 and the intended recipient would register with platform 20 for this service, so potentially user 10 would build a list of people that they are prepared to accept messages from including the banking institutions for application, and also working as a secondary SPAM filter.

In one embodiment of the present invention, enhanced services platform 20 and its two-way SMS services may be employed by users 10 to create, view and vote on various multi-media files, such as digital video clips.

For identification purposes, the director is user 10 who creates and uploads a video; a fan is a user 10 who is a member of a director's fan club who can view videos only; a Member Of The Academy (MOTA) is a user 10 that may view and vote on videos; the academy are system administrator and the general pubic are on-line or wireless users 10 that are casual visitors to the voting system on platform 20.

For example, user 10 may register as a director, a fan or a voting member of the service. Directors can upload videos from the web or from a mobile device to platform to be stored on database 60. For example a user 10 with director status may shoot a digital video clip using camera 13 from their mobile device 12 and can then upload the video to platform 20 for viewing and downloading by others users 10, such as directors and fans. Users 10 with fan status can watch videos and receive alerts when a new video is uploaded from a director for whom they are a fan on the web or on mobile device 12;

Voting users 10 of the service, such as members with full registration, can then vote for their favorite videos in various categories. Voting users 10 may vote by sending a text message to a premium short code. Additionally, members of the general public can search for and download videos from platform 20 by searching on line or through their mobile device 12. This availability to the general public is to encourage additional registrations to the service.

In addition to allowing the voting on various videos, an award system can be used for rewarding directors for their submissions. For example, by a simple tallying system awards are made to videos in each category and a best director is awarded based on a simple vote count, Voting database 55 is used to support the storage of votes on various clips. The award for best director may entitle that user 10 to be awarded a prize such as having the video aired on national TV, in an advertisement for example.

In one embodiment, platform 20 may charge directors to upload videos that they want considered for an award, and may also charge for downloading videos to voting members of the system, fans, or general public mobile devices 12.

Figure 13:
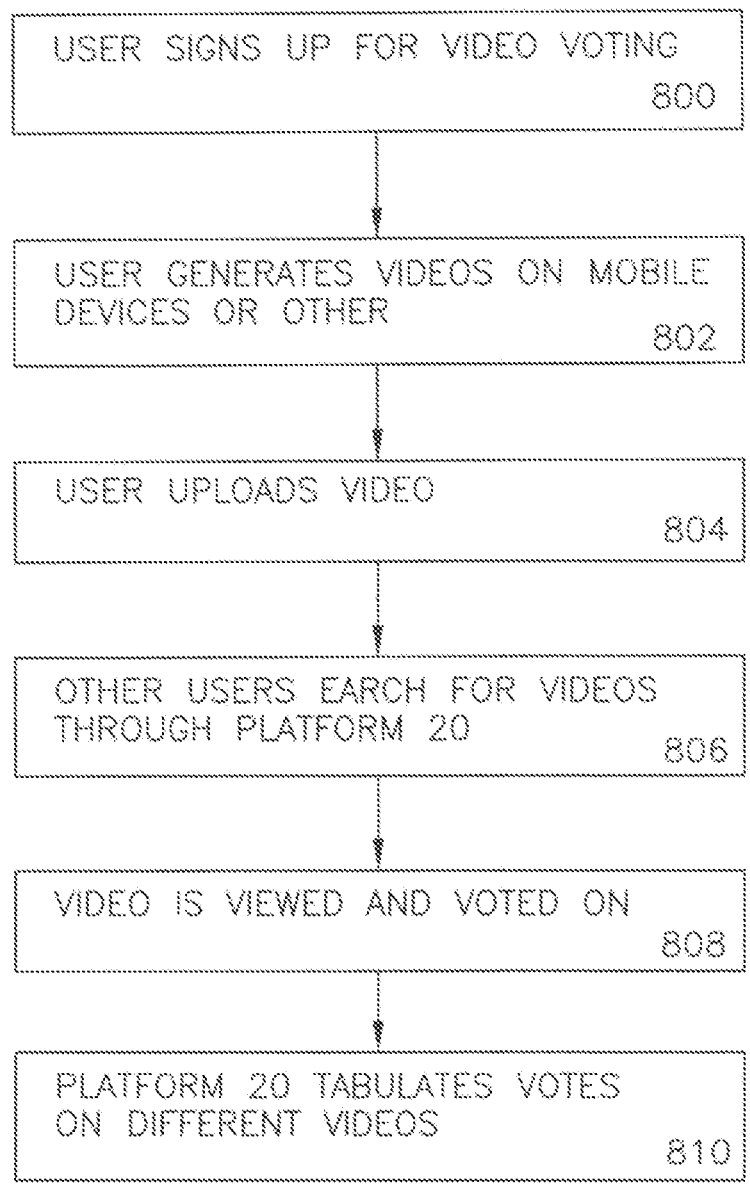
FIG. 13 is a flow chart of an on-line voting system on the enhanced service platform, in accordance with one embodiment of the present invention.

As such, as illustrated in FIG. 13, in a first step 800 a user 10 registers to use the voting feature of platform 10 as a director or as a member of the academy (MOTA). This may include registering as a Director; a Fan; a MOTA; or any combination of them, MOTA typically identify a category or categories of interest. Users 10, regardless of status select an ID and password. Such process can be performed on-line or over a text service on the mobile device 12 of user 10.

At a next step 802, director status users 10 may establish a fan club to generate interest in their movie clips, Fans, at this stage may sign up to join fan clubs of desired directors. At step 804, a director uploads a video to platform 20 using their mobile device 12 or a web page. User 10 with director status may annotate the video with a blurb, cast, crew, information etc...., and is preferably given some editing options.

Next, at step 806 fans directors and MOTA may download videos from platform 20 by texting a short code to platform 20 for the desired video. The search for a desired video be sent as a text search, similar to that discussed above in FIG. 5, where the text request is parsed at step 304. Here the video or clip request is parsed and a group of 1 to three possible videos meeting the search criteria are sent to user 10. Alternatively, the selection of videos or clips may be menu driven including most frequently requested lists or current vote leaders etc....

At step 808, after viewing users 10 may text a vote to platform 20, rating the video where the votes are stored in voting module 55. At step 810, platform 20 may tabulate the vote after some pre-defined amount of time to determine the most popular videos/directors and issue awards in appropriate categories. Throughout the process, SMS messages 400 such as voting messages, and notifications to users 10 may include a link 406 for connecting to platform 20 to a live operator to assist with any problems, similar to the process outlined above.

As additional options such a video/voting feature supported on platform 20 may also allow general public viewing of video clips to encourage new users 10 to join the feature and may also facilitate communications directly between members to encourage increased SMS and -email traffic. Furthermore, searching of the videos, either on-line or using mobile devices 12 is facilitated by allowing text searches by category (animals, friends, sports etc. ... ), director name, time and date, length of video, etc. ... Such searches are available to both the general public as well as registered users 10.

Figure 14:
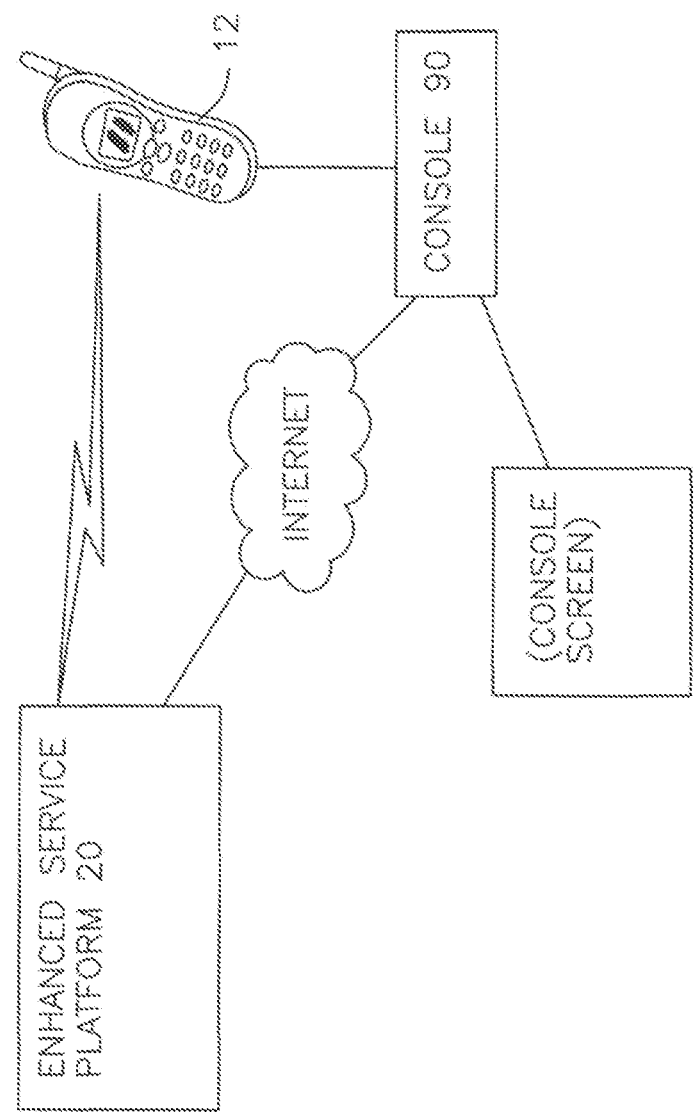
FIG. 14 is an image of a game console and enhanced service platform, in accordance with one embodiment of the present invention.

In one embodiment of the present invention, as illustrated in FIG. 14, mobile device 12 can be used in conjunction with platform 20 to provide updates, patches, modifications, etc. via two-way SMS directory assistance. Here video game console 90 is either connected to internet or directly to mobile device 12 of user 10.

In the area of video games and their consoles, many more complicated games frequently have patches, updates, additional levels or other fan generated additions that are widely dispersed across the internet.

Figure 15:
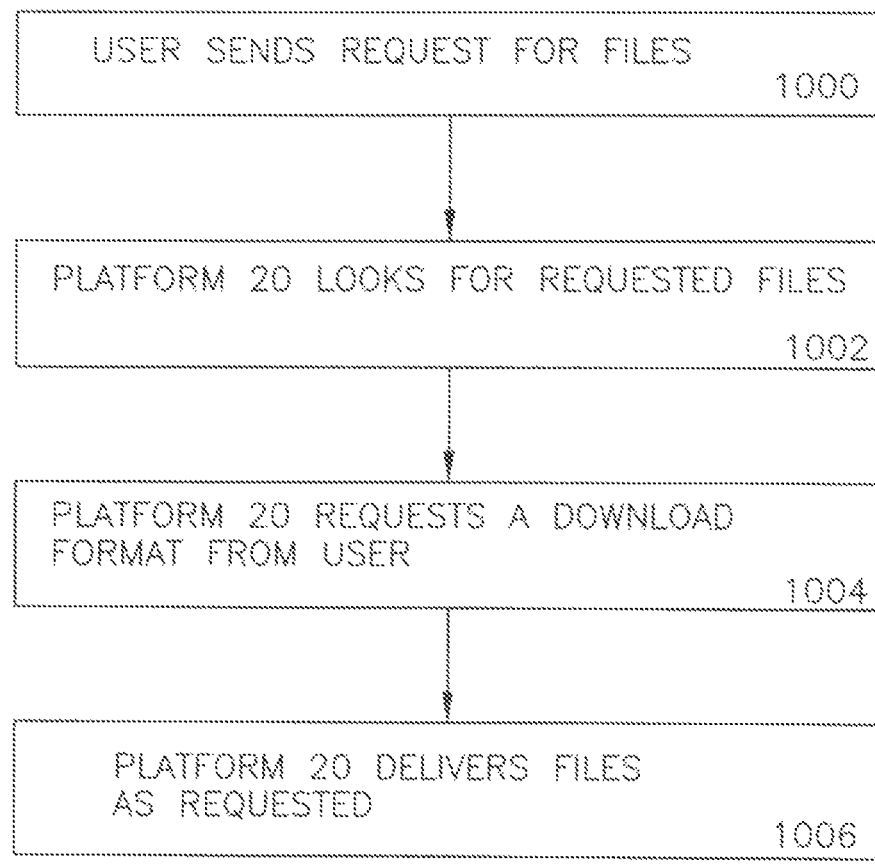
FIG. 15 is a flow chart for downloading files to the console in FIG. 14 from enhanced services platform, in accordance with one embodiment of the present invention.

In one embodiment of the present invention, as illustrated in flow chart FIG. 15, at step 1000, user 10 contacts platform 20 by SMS requesting an update or plug-in for their game console. Next, at step 1002, automated response module 40 or operator terminal 35 performs a search for the desired information/download At step 1004, if found platform 20 sends response message 400 acknowledging that the desired files have been found and is ready for download. At step 1006, user 10 sends a reply text indicating that they are connecting directly to the console and that the download should be sent directly through mobile device 12. Alternatively, the user may respond with an IP or MAC address of the console if such console is directly connected to the internet, instructing platform 20 to send the files directly to console 90.

It is understood that response message 400, as above includes a link 406 that, should issues arise regarding the provided files to console 90, a live operator is able to speak to user 10 who activates link 406, and where transaction record 100 is automatically popped (pre-entered) to the operator's terminal so they will already know the nature of the call.

In one embodiment of the present invention, SMS messaging facilitated by platform 20 may provide the additional feature for sending and receiving of short messages between different users 10, as well as the addition of speech capabilities to standard text messaging systems creating a multimodal SMS service (hereinafter referred to as multimodal messages).

In accordance with one embodiment of the invention, this feature presents an SMS facilitated multimedia feature supported by a multimedia SMS module 79 for users 10. Unlike other SMS features described above where users 10 communicate with platform 20, here users 10 communicate with one another using platform 20 as a facilitator. This feature further uses platform 20 to provide a two way web based promotional feature for building memberships and sending bulk and low volume SMS text messages to mobile phones 12 via the Internet.

Figure 16:
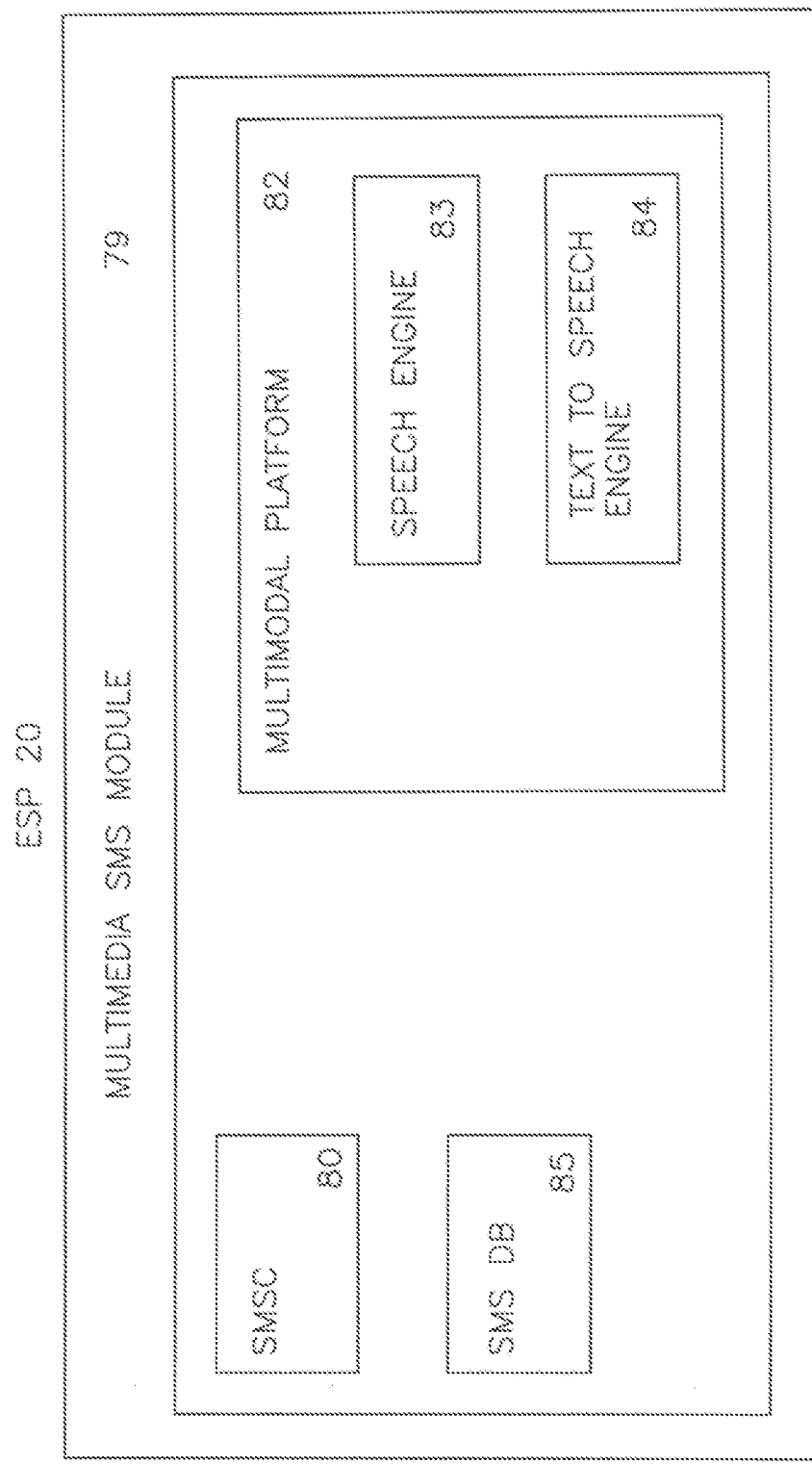
FIG. 16 is a block diagram of an SMS conferencing module in enhanced services platform, in accordance with one embodiment of the present invention.

As illustrated in FIG. 16, enhanced services platform 20 is configured to further maintain network components including a Short Message Service Center (SMSC) 80 and a multimodal platform module 82.

Such a feature of system supported by multimedia SMS module 79 contemplates the use of user's 10 input and/or output devices 12 including those capable of playing and recording speech and those capable of entering and displaying text information; a speech recognition engine 83 on multimodal platform module 82 with an additional capability of recording voice to a SMS speech database 85; a text-to speech engine 84 on multimodal platform module 82 for rendering text into spoken words; an application server on multimodal platform module 82 that uses the speech engines to combine speech with text messages created using one the input devices; and sending such combined messages to a device 12 that provides one or more of the output capabilities The text input on mobile device 12 is used to compose a message to be sent using standard SMS technology. The multimodal platform module 82 and the features it supports on platform 20 combine the text message (if any) with a spoken message if desired by user 10. The combined or multimodal message can be sent to recipient(s) who then can read the text message and retrieve, from database 85 of platform 20, the associated voice message. Speech recognition engine 83 may be used for easy control of the playback and recording of voice messages as well as the control of other useful messaging function.

An application scenario is a sequence of user actions, spanning a single or multiple modes. For example, user 10 may start the application in data mode and then switch to voice mode. Multiple application scenarios can be supported using multimedia SMS module 79.

Switching between modes can be actuated via user and/or application control. These scenarios can be supported from a single application code base in a single multimedia SMS module 79. In each of the following scenarios both Alice and Bob are wireless subscribers (users 10), and each operates a wireless telephone or mobile device 12, where the wireless telephones and other components are capable of communicating through a wireless network.

Example 1

1. Alice sends a text SMS to Bob and Bob replies with voice using a multimodal SMS generated using multimedia SMS module 79 of platform 20.

In this scenario. Alice sends a text SMS message to Bob, which may be sent through Short Message Service Center (SMSC) 80. Bob receives and views the SMS message and chooses to respond with a multimodal SMS message generated using multimedia SMS module 79. Bob chooses to reply using voice, clicks on the multimoda SMS link that is embedded in the SMS message, and records his voice message. The multimodal SMS service also allows Bob to:
   A) Listen to other multimodal SMS messages;
   B) Delete the message or other Multimodal SMS messages; and
   C) Forward this and other multimodal SMS messages.

It should be noted that the link embedded in an SMS message can be created at the sending device, or by using the multimedia module 79 to SMSC link, or by using a modified SMSC. In a preferred embodiment, multimedia module 79 adds the links.

Example 2

2. Alice receives a multimodal SMS from Bob, reads the text, and clicks the multimodal SMS link to retrieve and hear the voice portion of the message.

Scenario 2: For this scenario, Alice receives a text SMS notifying her that Bob has sent her a multimodal SMS. Alice clicks on the link embedded in the SMS message to listen to the voice message. After she has heard the message, she has three options:
   A) Reply to the message using voice in a multimodal SMS message;
   B) Reply to the message with text delete the message; and
   C) Forward the message as a multimodal SMS message containing voice and any original text.

Example 3

3. Bob connects to the multimedia SMS module 79 and records a voice message for Alice. A Multimodal SMS is sent to Alice, containing a link to the voice message left by Bob.

Scenario 3: In this example, Bob initiates a multimodal SMS message to send to Alice. He connects to multimedia SMS module 79 and speaks Alice's number, then records and sends his Multimodal SMS message (which may include, possibly, creating a voice message. Alice receives an SMS message with an embedded link which she can activate to listen to the message.

Example 4

4. Alice calls in and chooses to listen to her SMS messages, Scenario 4: In this scenario, Alice wishes to listen to her text-based SMS messages. She is driving or unable to view her mobile screen. She calls a number connecting her to platform 20 and then is led through a series of voice prompts that enable her to access, select, and listen to the text, rendered by the Text-to-Speech engine 84 of multimodal platform module 82, (and any recorded speech) in the multimodal SMS messages that she has received. Once again, she has three options:
   A) Reply to the message with a multimodal SMS message containing voice;
   B) Reply to the message with text. Delete the message; and
   C) Forward the message as a multimodal SMS message containing voice and any original text.

Figure 17:
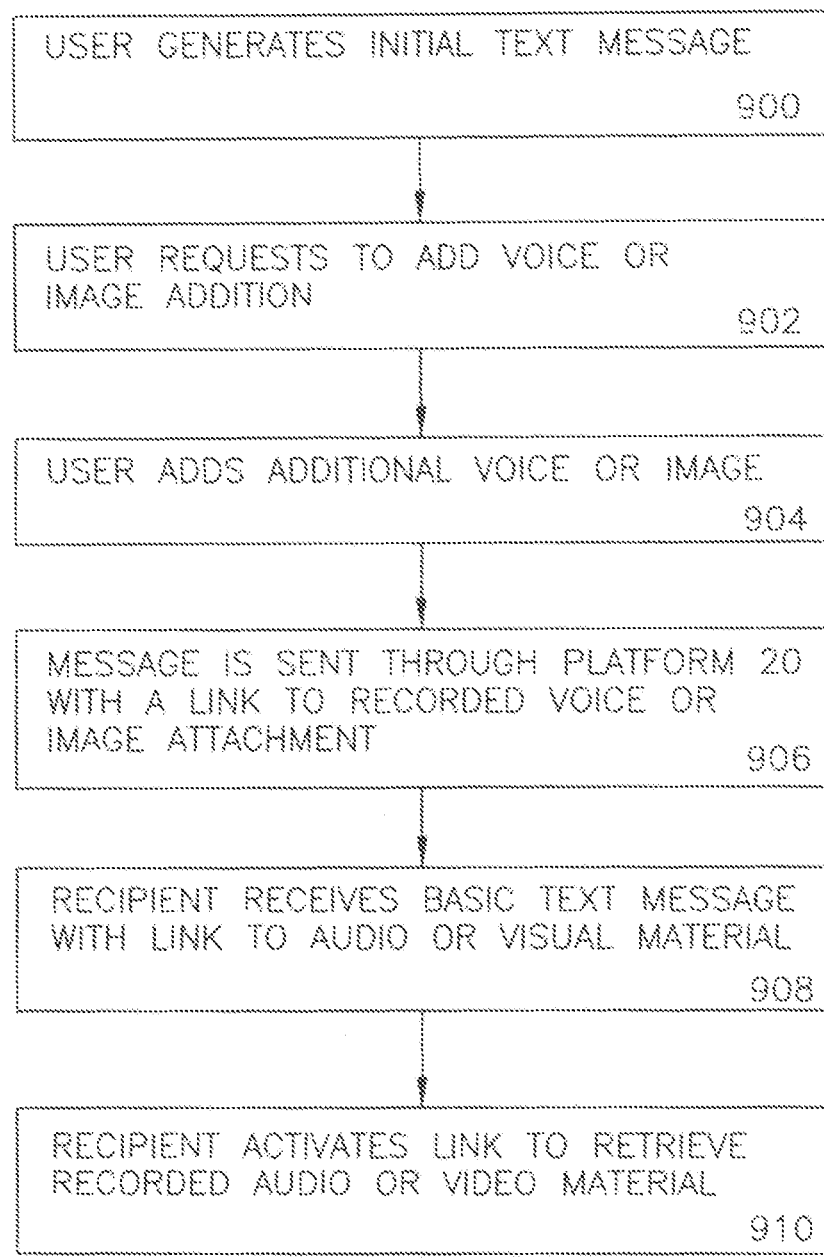
FIG. 17 is a flow chart for creating a multi-modal SMS on conferencing module from FIG. 7, in accordance with one embodiment of the present invention.

In one embodiment of the present invention, as illustrated in flow chart FIG. 17 a multimodal SMS message is created at a first step 900, where user 10 creates any text message they wish to send (possibly even an empty message) and determines to whom the message is to be sent using what-ever mechanisms are provided by the device.

At step 902, if user 10 wishes to add speech to the SMS message, they clicks on a multimodal SMS link in their phone book or similar mechanism provided by the device 12, which connects them through the voice network to multimodal SMS module 82, assuming they are subscribers to the features supported by multimedia SMS module 79 of platform 20. If the user selects to add an image or voice recording, the same transaction record 100 is assigned to the additional voice or image record.

At step 904, instructions are provided to user 10 to allow them to record their voice message through the speech recognition engine 83. The recorded voice message is then stored for future retrieval SMS speech database 85. The specific storage mechanism used for SMS speech database may include a media server, a database or any other storage mechanism that facilitates storing audio content.

Next, at step 906, user 10 then sends the SMS message, which is transmitted through the SMS network to the Short Message Service Center 80, (SMSC) which, transmits the message to the recipient and also communicates a link within the message that allows multimedia SMS module 79 to uniquely associate the SMS message and the stored voice message in SMS speech database 85.

Thus, in the present invention, voice is sent as part of an SMS message by including within the SMS message a link to retrieve the voice message from another location. For example, the SMS message may contain a link to multimedia SMS module 79 which, when accessed, causes the voice message to be retrieved from SMS Speech database 85. This link includes an embedded transaction ID 101 or transaction record 100 such that platform 20 recognizes the ID and retrieves any associated voice or image files from database 85 that have the same ID, as applied from step 902 above. Alternatively, the link may be to any other location (third party), where user 10 is led through any series of events to obtain the voice message.

At step 908, when the message is received by user 10 at the other end of the connection there is a telephony link embedded in the message that, using whatever method is available on the recipients' device 12, once accessed, connects the recipient to SMS conferencing module 79 which retrieves the voice message from SMS speech database 85 and plays it to the recipient. At step 910 recipient users 10 may include a voice reply, a text SMS reply or deletion of the message stored on the server.

Additional features that may be employed with the above described multimodal SMS conferencing applications may include providing user 10 with the capability of storing, editing and applying lists of recipient users 10 so that a message can be distributed to a number of recipients. These lists are preferably stored in the SMS conferencing module 79. Such lists could be entered by conventional means or could be uploaded to platform 20. Once stored the lists could be used for addressing multimodal SMS or even standard text SMS messages.

Instead of composing the text SMS message in advance, one embodiment of the present invention further envisions addition of text material to a voice message while a voice connection is active to the speech recognition engine 83. This preferably is done using an Unstructured Supplementary Services Data (USSD) channel which is a standard low-bit-rate channel that can be active, if enabled by the network provider 14, simultaneously with a voice connection. (This can also be accomplished by using SMS technology to directly send an SMS.) Those skilled in the art will also realize that other mechanisms inherent in current devices and networks can be used to simultaneously encode and send the small text messages required, while a voice connection is active.

A further exemplary capability is the storage of preset or standard messages ("canned" messages) that could be stored in the SMS speech database 85 and maintained using a web or Wireless Application Protocol (WAP) interface. Once stored these messages would be accessible using the voice interface already provided as part of Multimodal SMS.

If contacts are stored in mobile device 12, rather than in the network, they can also be used in addressing a Multimodal SMS message. They could be accessed as part of the multimodal services of platform 20 by using an application on device 12 or through the use of USSD as previously described. If a buddy list, used with a Push-to-talk (PTT) capable device, is available that list can be used for sending a multimodal SMS and it also can be used for sending a voice message to a friend who is off-line using the PTT capability. The resulting message can also be retrieved using PTT.

Any message, or text portion of a message, sent via standard SMS mechanisms can, as part of the invention described herein, be intercepted and converted, using text to speech engine 84 of multimodal platform module 82, to a multimodal SMS for forwarding to the recipient. If one of users 10 (e.g., the sender of the message) has access to a device 12 that supports MMS or EMS capability the invention allows the speech component of an enhanced message to be removed from the message, stored in the multimodal platform module 82 and delivered as a Multimodal SMS message to a recipient even if the recipient has a device only supporting SMS text capability.

Multimodal platform module 82 of SMS conferencing module 79 also allows multimodal SMS message creation and retrieval by other means and with other than standard wireless telephones. Any device that supports either Simultaneous or Sequential Multimodal applications, or Web applications, can be used. These include Personal Digital Assistants (PDA), Pocket PCs, laptop and desktop PCs as well as any wireless or wire line devices 12 supporting such applications. As an illustrative example, a PDA that supports simultaneous multimodal applications could be used to enter text via a keyboard while recording the voice portion of the message simultaneously. Complex control option can be displayed on the PDA screen and selected using a stylus. Having access to such devices 12, or to MMS or EMS devices, an additional inventive idea allows creation and display of video data, which can also be stored in the SMS speech database 85 and controlled through the multimodal SMS conferencing module 79.

If user 10 has a WAP capable mobile device 12, image extensions to text SMS may be provided by storing these in a separate image directory in SMS database 85 and providing them, through the multimodal platform module 82 application for display on the WAP browser in mobile device 12.

In general, since the data, voice or image, associated with the multimodal SMS message is stored in the SMS database 85 it can be directed to other media. Such media illustratively includes print media. The multimodal SMS can be printed on a Kiosk or home computer printer. The voice portion of a multimodal SMS can be directed for retrieval to any standard voicemail system, such as those provided for network storage of voice messages, or directed to any telephone for listening or possible storage on local voicemail. In further illustration, in addition to direct printing of image data portion, the voice portion can be converted to text using the ASR ("Automatic Speech Recognition") element of the Speech Server and similarly directed to a standard printer.

It is understood that any similar SMS conferencing applications carried out on a similar SMS conferencing module 79, are within the contemplation of the present invention.

What is claimed is:

1. An enhanced services platform said platform comprising:
    an interface for receiving a communication from a user requesting a desired data;
    an automated response module for parsing said communication and retrieving said desired data affiliated with a first entity, said enhanced services platform configured to arrange said desired data into a response message that is sent to said user said response message including an advertisement related to said desired data, said advertisement associated with a second entity,
    wherein said response message includes an embedded code corresponding to a link allowing said user to re-contact said enhanced services platform; and
    an operator assistance module configured to receive communications from said user initiated via said link to provide further assistance regarding said user's request.

2. The enhanced services platform as claimed in claim 1, wherein said enhanced. services platform is configured to receive text communication from said user in accordance with any one of the group consisting of SMS (Short Message Service), IM (Instant Message), and e-mail.

3. The enhanced services platform as claimed in claim 1, wherein said communication platform is further configured to generate a transaction record including a transaction ID field for storing a unique ID code for tracking said user's request.

4. The enhanced services platform as claimed in claim 3, further comprising a user request field wherein said user request field includes a copy of said text communication from a user requesting a desired data, 5. The enhanced services platform as claimed in claim 3, further comprising a response message field wherein said response message field includes a copy of said response message that was sent to said user.

6. The enhanced services platform as claimed in claim 3, wherein said embedded link in said response message includes data identifying said transaction record.

7. The enhanced services platform as claimed in claim 3, wherein when said enhanced services platform receives a re-contact request from said user via said embedded link in said response message, said enhanced services platform recognizing said transaction ID, displays said user request and said response message to an operator at said operator assistance module.

8. The enhanced services platform as claimed in claim 1, wherein said embedded link, when activated, directs a mobile device of said user to place a telephone call to said enhanced services platform.

9. The enhanced services platform as claimed in claim 1, wherein said embedded link corresponds to a hot button command on a mobile device of said user.

10. The enhanced services platform as claimed in claim 1, wherein said embedded link corresponds to a voice command on a mobile device of said user.

11. The enhanced services platform as claimed in claim 1, further comprising a derivative user identifier database module, configured to store information about frequent users of said enhanced services platform in a user profile.

12. The enhanced services platform as claimed in claim 11, wherein said user profile includes a user identification field, a history field, and a preferences field.

13. The enhanced services platform as claimed in claim 12, wherein said history field includes past requests for desired data made by said user.

14. The enhanced services platform as claimed in claim 13, wherein said preferences field includes user preferences for how said user would like to interact with said enhanced services platform.

15. The enhanced services platform as claimed in claim 14, wherein said preferences include any one of the group consisting of language choice and response message format.

16. The enhanced services platform as claimed in claim 15, wherein said preferences are set in said preferences field based on prior use by said user as stored in said history field.

17. The enhanced services platform as claimed in claim 15, wherein said preferences are set in said preferences field are configured to be set manually via direct user contact with said enhanced services platform, 18. The enhanced services platform as claimed in claim 1, wherein a mobile device of said user includes auto-location ability.

19. The enhanced services platform as claimed in claim 18, wherein said auto-location ability is GPS (Global Positioning System).

20. The enhanced services platform as claimed in claim 18, wherein said enhanced services platform is configured to receive text communication from a user requesting a desired data in a nearest-to-me format, requesting a listing that is in proximity to said user's geographic location.

\* \* \* \* \*